(12) United States Patent
Zhou et al.

(10) Patent No.: US 12,040,979 B2
(45) Date of Patent: Jul. 16, 2024

(54) COMMUNICATIONS METHOD, APPARATUS, AND SYSTEM

(71) Applicant: HUAWEI TECHNOLOGIES CO.,LTD., Guangdong (CN)

(72) Inventors: Han Zhou, Shanghai (CN); Hancheng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 17/511,570

(22) Filed: Oct. 27, 2021

(65) Prior Publication Data

US 2022/0052955 A1   Feb. 17, 2022

Related U.S. Application Data

(63) Continuation of application No. PCT/CN2020/075908, filed on Feb. 19, 2020.

(30) Foreign Application Priority Data

Apr. 28, 2019 (CN) .......................... 201910350621.5

(51) Int. Cl.
*H04L 47/20* (2022.01)
*H04L 47/2441* (2022.01)
(Continued)

(52) U.S. Cl.
CPC .......... *H04L 47/20* (2013.01); *H04L 47/2441* (2013.01); *H04L 67/146* (2013.01); *H04W 80/10* (2013.01)

(58) Field of Classification Search
CPC ... H04L 47/20; H04L 47/2441; H04L 67/146; H04L 41/0894; H04L 41/0803; H04W 80/10; H04W 24/02
See application file for complete search history.

(56) References Cited

U.S. PATENT DOCUMENTS 8,606,911 B2   12/2013 Raleigh et al.
2004/0266478 A1*  12/2004 King .................. H04M 1/725
                                                    455/554.2
(Continued)

FOREIGN PATENT DOCUMENTS

CN    104488240 B    4/2017
CN    109429370 A    3/2019
(Continued)

OTHER PUBLICATIONS

Huawei et al.,"Discussion on support of SGS integration with TSN",3GPP TSG-SA WG2 Meeting #131 S2-1902008,Feb. 25-Mar. 1, 2019, Santa Cruz, Tenerife, ES,total 3 pages.
(Continued)

*Primary Examiner* — Cheikh T Ndiaye
(74) *Attorney, Agent, or Firm* — HUAWEI TECHNOLOGIES CO., LTD.

(57) ABSTRACT

In a method for network communications, a session management network element receives an identifier of a session of a terminal device, an identifier of a port corresponding to the session, and a processing policy of a data flow for the port. The session management network element determines, according to the identifier of the port, a type of a first device corresponding to the port. The session management network element then sends, according to the determined type of the first device, processing policy information to the first device. The processing policy information comprises the identifier of the port and the processing policy of the data flow.

19 Claims, 11 Drawing Sheets

(51) Int. Cl.
*H04L 67/146* (2022.01)
*H04W 80/10* (2009.01)

(56) References Cited

U.S. PATENT DOCUMENTS

| | | | | |
|---|---|---|---|---|
| 2007/0110083 | A1* | 5/2007 | Krishnamoorthy | H04L 12/66 370/466 |
| 2008/0273486 | A1* | 11/2008 | Pratt | H04W 84/22 370/328 |
| 2018/0302330 | A1* | 10/2018 | Bush | H04L 47/28 |
| 2021/0007160 | A1* | 1/2021 | Sivasiva Ganesan | H04W 28/0268 |

FOREIGN PATENT DOCUMENTS

| | | | |
|---|---|---|---|
| WO | 2018119595 | A1 | 7/2018 |
| WO | 2018128528 | A1 | 7/2018 |
| WO | 2018137489 | A1 | 8/2018 |
| WO | 2018202008 | A1 | 11/2018 |
| WO | 2018233484 | A1 | 12/2018 |

OTHER PUBLICATIONS

Ericsson,"TSN QoS and traffic scheduling in SGS",3GPP TSG-SA WG2 Meeting #130 S2-1901150,Jan. 21-25, 2019, Kechi, India,total 9 pages.

Ericsson,"TSN-5GS QoS mapping",3GPP TSG-SA WG2 Meeting #132 S2-1903376,Apr. 8-12, 2019,total 7 pages.

Ericsson,"Support for IEEE 802.1 Qbv scheduling",3GPP TSG-SA WG2 Meeting #132 S2-1903379,Apr. 8-12, 2019,total 2 pages.

Huawei et al.,"Procedures for 5GS Bridge information reporting and configuration",3GPP TSG-WG SA2 Meeting #134 S2-1908619,Sapporo, Japan, Jun. 24-Jun. 28, 2019, Total 6 Pages.

3GPP TS 23.316 V0.2.0 (Apr. 2019);3rd Generation Partnership Project;Technical Specification Group Services and System Aspects Wireless and wireline convergence access support for the 5G System (5GS)(Release 16);total 50 pages.

Huawei, HiSilicon, "Procedures for 5GS Bridge information reporting and configuration",3GPP TSG-WG SA2 Meeting #134 S2-1908385,Sapporo, Japan, Jun. 24-Jun. 28, 2019, Total 7 Pages.

3GPP TS 23.501 V16.0.2 (Apr. 2019);3rd Generation Partnership Project; Technical Specification Group Services and System Aspects-;System Architecture for the 5G System;Stage 2(Release 16);total 317 pages.

Huawei et al.,"Discussion on 5GS Bridge management and TSN stream establishment",3GPP TSG-SA WG2 Meeting #133 S2-1905675,Reno, Nevada, USA, May 13 17, 2019,Total 4 Pages.

3GPP TS 23.502 V16.0.2 (Apr. 2019);3rd Generation Partnership Project;Technical Specification Group Services and System Aspects;Procedures for the 5G System;Stage 2(Release 16);total 419 pages.

Qualcomm Incorporated,"Addressing open issues for TSN",SA WG2 Meeting #132 S2-1903273,Xi"an, P.R. China, Apr. 8-12, 2019,Total 4 Pages.

3GPP TS 23.503 V16.0.0 (Mar. 2019), 3rd Generation Partnership Project; Technical Specification Group Services and System Aspects; Policy and Charging Control Framework for the 5G System; Stage 2(Release 16), 84 pages.

Nokia et al.,"Update to Support PDU Session Binding",SA WG2 Meeting #132 S2-1903656,Apr. 8-Apr. 12, 2019, Xian,Total 4 Pages.

3GPP TS 29.512 V16.0.0 (Mar. 2019);3rd Generation Partnership Project;Technical Specification Group Core Network and Terminals;5G System; Session Management Policy Control Service;Stage 3(Release 16);total 142 pages.

Ericsson,"Support for IEEE 802.1Qbv scheduling",3GPP TSG-SA WG2 Meeting #132 S2-1903378,Xi an—China, Apr. 8 12, 2019,Total 6 Pages.

Ericsson,"TSN-5GS QoS mapping",3GPP TSG-SA WG2 Meeting #131 S2-1901718,Feb. 25-Mar. 1, 2019, Santa Cruz, Spain, Total 6 Pages.

Huawei et al.,"Updates on Solution #18",3GPP TSG-SA WG2 Meeting #129Bis S2-1812232,West Palm Beach, USA, Nov. 26-Nov. 30, 2018, Total 8 Pages.

\* cited by examiner

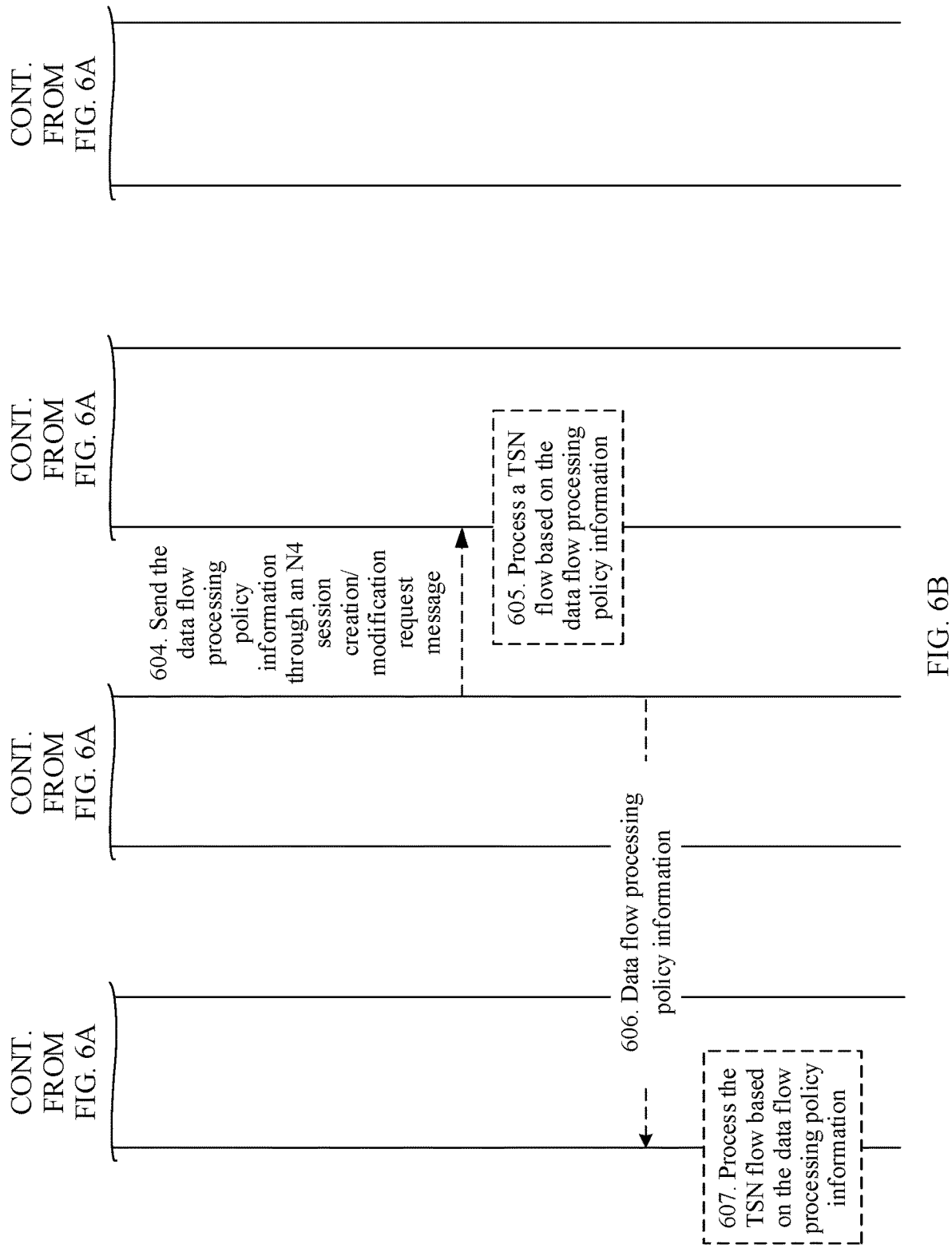

COMMUNICATIONS METHOD, APPARATUS, AND SYSTEM

CROSS-REFERENCE TO RELATED APPLICATIONS

This application is a continuation of International Patent Application No. PCT/CN2020/075908, filed on Feb. 19, 2020, which claims priority to Chinese Patent Application No. 201910350621.5, filed on Apr. 28, 2019. The disclosures of the aforementioned applications are hereby incorporated by reference in their entirety.

TECHNICAL FIELD

This application relates to the field of mobile communications technologies, and in particular, to a communications method, apparatus, and system.

BACKGROUND

In a network architecture in which a 3rd generation partnership project (3GPP) network (using a 5th generation (5G) system as an example) interworks with time sensitive networking (TSN), the 5G system and a TSN translator function as a logical TSN switching node (referred to as a switching node in the 5G system) as a whole.

In a TSN architecture, a TSN switching node may receive processing policy information generated for each port of the TSN switching node. Therefore, each port of the TSN switching node may execute a processing policy for the port based on the processing policy information.

However, in the network architecture in which 5G interworks with TSN, there is currently no related solution about how to configure a processing policy for a port on the switching node in the 5G system.

SUMMARY

This application provides a communications method, apparatus, and system, to configure a processing policy for a port on a switching node in a 5G system.

According to a first aspect, this application provides a communications method. The method includes: A second device receives an identifier of a session of a terminal device and processing policy information for a port. The second device sends the processing policy information to a first device corresponding to the session. In this embodiment, based on an existing 5G management and forwarding architecture, the second device sends the processing policy information to the first device, and the first device configures a processing policy for the port based on the processing policy information. Therefore, a TSN management system configures a processing policy for a port on a switching node in a 5G system, so that the switching node in the 5G system is enabled to support a processing policy for the port that is defined in a TSN protocol.

In a possible implementation, before the second device sends the processing policy information to the first device corresponding to the session, the second device determines a type of the first device. The type of the first device is a terminal device or a user plane network element.

In a possible implementation, the second device determines the type of the first device based on an identifier of the port in the processing policy information. Alternatively, the second device receives first indication information, and first indication information is used to indicate the type of the first device. In this embodiment, the second device is notified of the type of the first device through the indication information, so that the second device can determine whether the processing policy information needs to be sent to the terminal device or the user plane network element.

In a possible implementation, the processing policy information includes the identifier of the port and a processing policy of a data flow.

In a possible implementation, the second device sends second indication information to the first device, and the second indication information is used to indicate that the processing policy information is policy information for the port. In this embodiment, the second device may learn, through the second indication information, that the processing policy information is the policy information for the port.

In a possible implementation, the second device is a policy control network element. The second device receives the identifier of the session of the terminal device and the processing policy information for the port from an application function network element or a session management network element. The second device sends, through the session management network element, the processing policy information to the first device corresponding to the session.

In a possible implementation, the second device is a session management network element. The second device receives the identifier of the session of the terminal device and the processing policy information for the port from an application function network element. When the first device is the user plane network element, the second device sends, through an N4 session of the terminal device or an interface at a device granularity between the second device and the first device, the processing policy information to the first device corresponding to the session. Alternatively, when the first device is the terminal device, the second device sends, through a non-access stratum NAS message or a user plane network element, the processing policy information to the first device corresponding to the session.

In a possible implementation, the second device is a user plane network element, and the first device is the terminal device. The second device receives the identifier of the session of the terminal device and the processing policy information for the port from an application function network element.

According to a second aspect, this application provides a communications method. The method includes: An application function network element receives processing policy information for a port from a centralized network configuration network element, and the processing policy information includes an identifier of the port. The application function network element determines an identifier of a session of a terminal device based on the identifier of the port, and the identifier of the session of the terminal device is used to determine a first device. The application function network element sends the identifier of the terminal device and the processing policy information to a second device. In this embodiment, based on an existing 5G management and forwarding architecture, the application function network element sends the processing policy information for the port to the second device, and the second device sends the processing policy information to the first device, so that the first device can configure a processing policy for the port. Therefore, a TSN management system configures a processing policy for a port on a switching node in a 5G system, so that the switching node in the 5G system is enabled to support a processing policy for the port that is defined in a TSN protocol.

In a possible implementation, the processing policy further includes a processing policy of a data flow.

In a possible implementation, when the identifier of the port is an identifier of a port of the terminal device, the application function network element determines, based on the identifier of the port, the identifier that is of the session of the terminal device and that corresponds to the identifier of the port. Alternatively, when the identifier of the port is an identifier of a port of a user plane network element, the application function network element determines an identifier of a port of the terminal device based on the identifier of the port, and determines the identifier that is of the session of the terminal device and that corresponds to the identifier of the port of the terminal device.

In a possible implementation, the application function network element sends indication information to the second device. The indication information is used to indicate a type of the first device, and the type of the first device is a terminal device or a user plane network element.

According to a third aspect, this application provides a communications apparatus. The apparatus may be a second device (for example, a terminal device or a user plane network element), or may be a chip used in the second device. The apparatus has functions of implementing the implementations of the first aspect. The functions may be implemented by hardware, or may be implemented by hardware executing corresponding software. The hardware or the software includes one or more modules corresponding to the functions.

According to a fourth aspect, this application provides a communications apparatus. The apparatus may be an application function network element, or may be a chip used in the application function network element. The apparatus has functions of implementing the implementations of the second aspect. The functions may be implemented by hardware, or may be implemented by hardware executing corresponding software. The hardware or the software includes one or more modules corresponding to the functions.

According to a fifth aspect, this application provides a communications apparatus, including a processor and a memory. The memory is configured to store a computer-executable instruction. When the apparatus runs, the processor executes the computer-executable instruction stored in the memory, so that the apparatus performs the method in either of the foregoing aspects.

According to a sixth aspect, this application provides a communications apparatus, including a unit or a means (means) configured to perform the steps in either of the foregoing aspects.

According to a seventh aspect, this application provides a communications apparatus, including a processor and an interface circuit. The processor is configured to: communicate with another apparatus through the interface circuit, and perform the method in either of the foregoing aspects. There are one or more processors.

According to an eighth aspect, this application provides a communications apparatus, including a processor, configured to be connected to a memory and invoke a program stored in the memory, to perform the method in either of the foregoing aspects. The memory may be located inside the apparatus, or may be located outside the apparatus. There are one or more processors.

According to a ninth aspect, this application further provides a computer-readable storage medium. The computer-readable storage medium stores an instruction. When the instruction is run on a computer, a processor is enabled to perform the method in either of the foregoing aspects.

According to a tenth aspect, this application further provides a computer program product including an instruction. When the computer program product is run on a computer, the computer is enabled to perform the method in either of the foregoing aspects.

According to an eleventh aspect, this application further provides a chip system, including a processor, configured to perform the method in either of the foregoing aspects.

According to a twelfth aspect, this application further provides a communications system, including a second device configured to perform the implementations of the first aspect and an application function network element configured to perform the implementations of the second aspect.

According to a thirteenth aspect, this application further provides a communications method. The method includes:

An application function network element receives processing policy information for a port from a centralized network configuration network element, and the processing policy information includes an identifier of the port.

The application function network element determines an identifier of a session of a terminal device based on the identifier of the port.

The application function network element sends the identifier of the terminal device and the processing policy information to a second device.

The second device sends the processing policy information to a first device corresponding to the session.

According to a fourteenth aspect, this application further provides a communications method. The method includes:

A second device receives an identifier of a session of a terminal device and processing policy information for a port, and send the processing policy information to a first device corresponding to the session.

The first device processes a data flow of the port based on the processing policy information.

BRIEF DESCRIPTION OF DRAWINGS

FIG. 6A and FIG. 6B are a schematic flowchart of another communications method according to this application;

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise stated, "a plurality of" means two or more than two.

Figure 1:
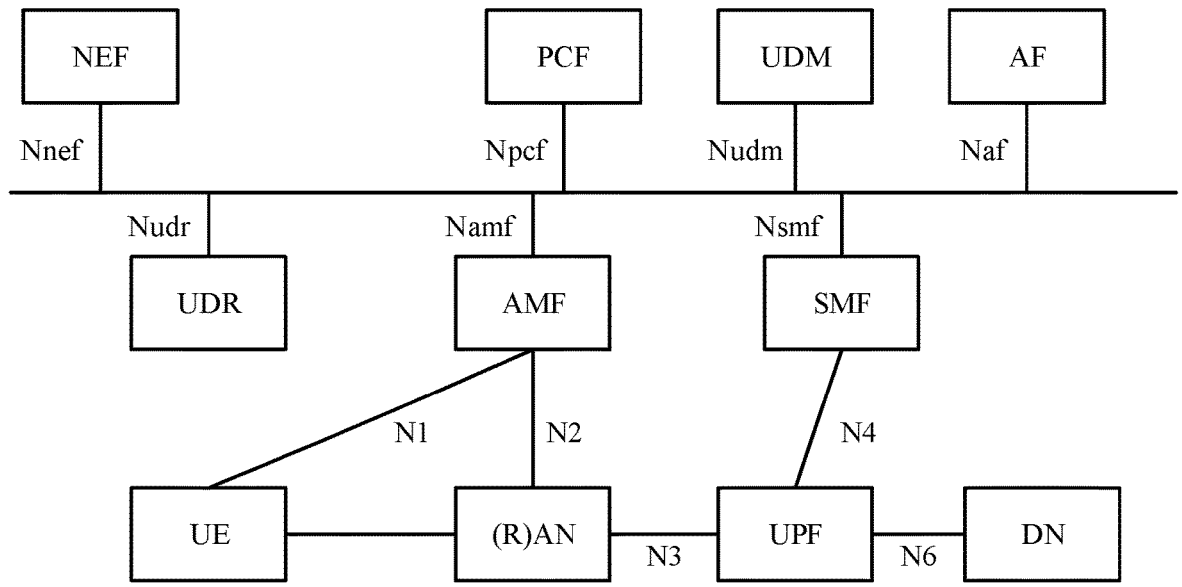
FIG. 1 is a schematic diagram of a 5G network architecture based on a service-oriented architecture.

FIG. 1 is a schematic diagram of a 5G network architecture based on a service-oriented architecture. The 5G network architecture shown in FIG. 1 may include three parts: a terminal device, a data network (DN), and a carrier network.

The carrier network may include a network exposure function (NEF) network element, a unified data repository (UDR), a policy control function (PCF) network element, a unified data management (UDM) network element, an application function (AF) network element, an access and mobility management function (AMF) network element, a session management function (SMF) network element, a (radio) access network ((R)AN), and a user plane function (user plane function, UPF) network element, and the like. In the foregoing carrier network, the parts other than the (radio) access network may be referred to as core network parts. For ease of description, an example in which the (R)AN is referred to as a RAN is used below for description.

The terminal device (which may also be referred to as user equipment (UE)) is a device having wireless receiving and sending functions, and may be deployed on land, for example, an indoor or outdoor device, a handheld device, or a vehicle-mounted device, or may be deployed on water (for example, on a steamship), or may be deployed in the air (for example, on an airplane, a balloon, or a satellite). The terminal device may be a mobile phone, a tablet computer (or pad), a computer having wireless receiving and sending functions, a virtual reality (VR) terminal, an augmented reality (AR) terminal, a wireless terminal in industrial control, a wireless terminal in self driving, a wireless terminal in remote medical, a wireless terminal in smart grid, a wireless terminal in transportation safety, a wireless terminal in a smart city, a wireless terminal in a smart home, or the like.

The terminal device may establish a connection to the carrier network through an interface (for example, N1) provided by the carrier network, and use a service such as data and/or voice provided by the carrier network. The terminal device may further access the DN through the carrier network, and use a carrier service deployed on the DN and/or a service provided by a third party. The third party may be a service provider other than the carrier network and the terminal device, and may provide a service such as data and/or voice for the terminal device. A specific representation form of the foregoing third party may be specifically determined based on an actual application scenario, and is not limited herein.

An access network device is also referred to as a (radio) access network ((R)AN) device, and is a device that provides a wireless communication function for the terminal. For example, the access network device includes but is not limited to: a gNodeB (gNB) in 5G, an evolved NodeB (eNB), a radio network controller (radio network controller, RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like.

The AMF network element is a control plane network element provided by the carrier network, and is responsible for access control and mobility management for accessing the carrier network by the terminal device, for example, including functions such as mobility status management, allocation of a temporary user identity, and user authentication and authorization.

The SMF network element is a control plane network element provided by the carrier network, and is responsible for managing a protocol data unit (PDU) session of the terminal device. The PDU session is a channel used to transmit a PDU, and the terminal device needs to transmit a PDU to the DN through the PDU session. The PDU session is established, maintained, deleted, and the like by the SMF network element. The SMF network element includes session-related functions such as session management (for example, session establishment, modification, and release, including tunnel maintenance between the UPF and the RAN), selection and control of the UPF network element, service and session continuity (SSC) mode selection, and roaming.

The UPF network element is a gateway provided by the carrier network, and is a gateway used for communication between the carrier network and the DN. The UPF network element includes user plane-related functions such as data packet routing and transmission, packet detection, service usage reporting, quality of service (QoS) processing, lawful interception, uplink packet detection, and downlink data packet storage.

The DN may also be referred to as a packet data network (PDN), and is a network located outside the carrier network. The carrier network may access a plurality of DNs, and a plurality of services may be deployed on the DNs, to provide a service such as data and/or voice for the terminal device. For example, the DN is a private network of a smart factory, a sensor installed in a workshop of the smart factory may be a terminal device, a control server of the sensor is deployed in the DN, and the control server may provide a service for the sensor. The sensor may communicate with the control server, to obtain an instruction of the control server, transmit collected sensor data to the control server according to the instruction, and the like. For another example, the DN is an internal office network of a company, a mobile phone or a computer of an employee of the company may be a terminal device, and the mobile phone or the computer of the employee may access information, data resources, and the like on the internal office network of the company.

The UDM network element is a control plane network element provided by the carrier network, and is responsible for storing information such as a subscription permanent identifier (SUPI), a security context (security context), and subscription data of a subscriber in the carrier network. The information stored in the UDM network element may be used for authentication and authorization when the terminal device accesses the carrier network. The subscriber in the carrier network may be specifically a subscriber using a service provided by the carrier network, for example, a subscriber using a SIM card of China Telecom, or a subscriber using a SIM card of China Mobile. The subscription permanent identifier (SUPI) of the subscriber may be a number of the SIM card or the like. A credential and the security context of the subscriber may be stored small files such as an encryption key of the SIM card or information related to encryption of the SIM card, and are used for authentication and/or authorization. The security context may be cookie (cookie), a token (token), or the like stored in a local terminal (for example, a mobile phone) of the subscriber. The subscription data of the subscriber may be a supporting service of the SIM card, for example, a data package or available data of the SIM card. It should be noted that the permanent identifier, the credential, the security context, the cookie (cookie), and the token are equivalent to information related to authentication and authorization, and are not limited or distinguished between each other for ease of description in this application document of the present invention. Unless otherwise specified, the security context is used as an example for description in this embodiment of this application. However, this embodiment of this application is also applicable to authentication and/or authorization information described in another manner.

The NEF network element is a control plane network element provided by the carrier network. The NEF network element securely exposes an external interface of the carrier network to a third party. When the SMF network element needs to communicate with a third-party network element, the NEF network element may serve as a relay for communication between the SMF network element and the third-party network element. When the NEF network element serves as the relay, the NEF network element may translate identification information of a subscriber and identification information of the third-party network element. For example, when the NEF needs to send SUPI of the subscriber from the carrier network to the third party, the NEF may translate the SUPI into an external identity (ID) of the subscriber. When the NEF network element needs to send an external ID (an ID of the third-party network element) to the carrier network, the NEF network element may translate the external ID into SUPI.

The PCF network element is a control plane function provided by the carrier network, and is configured to provide a policy of a PDU session for the SMF network element. The policy may include a charging related policy, a QoS related policy, an authorization related policy, and the like.

The AF network element is a function network element configured to provide various business services, and can interact with a core network through the NEF network element and interact with a policy management framework to perform policy management.

The UDR is configured to store data.

In FIG. 1, Nnef, Npcf, Nudm, Naf, Nudr, Namf, Nsmf, N1, N2, N3, N4, and N6 are interface sequence numbers. For meanings of these interface sequence numbers, refer to meanings defined in the 3GPP standard protocol. This is not limited herein.

It may be understood that the foregoing network elements or functions may be network elements in a hardware device, software functions running on dedicated hardware, or virtualized functions instantiated on a platform (for example, a cloud platform). Optionally, the foregoing network elements or functions may be implemented by one device, or may be jointly implemented by a plurality of devices, or may be one function module in one device. This is not specifically limited in this embodiment of this application.

In a forwarding process of the conventional Ethernet, when a large quantity of data packets instantaneously arrive at a forwarding port, a high forwarding latency or a packet loss may be caused. Consequently, the conventional Ethernet cannot provide a service with high reliability and a low transmission latency, and cannot meet requirements in fields such as vehicle control and the industrial internet. The institute of electrical and electronics engineers (IEEE) defines a related TSN standard for reliable transmission with a low latency, and the standard provides a reliable transmission service with a low latency based on layer 2 switching, to ensure reliability of latency-sensitive service data transmission and provide a predictable end-to-end transmission latency.

Figure 2:
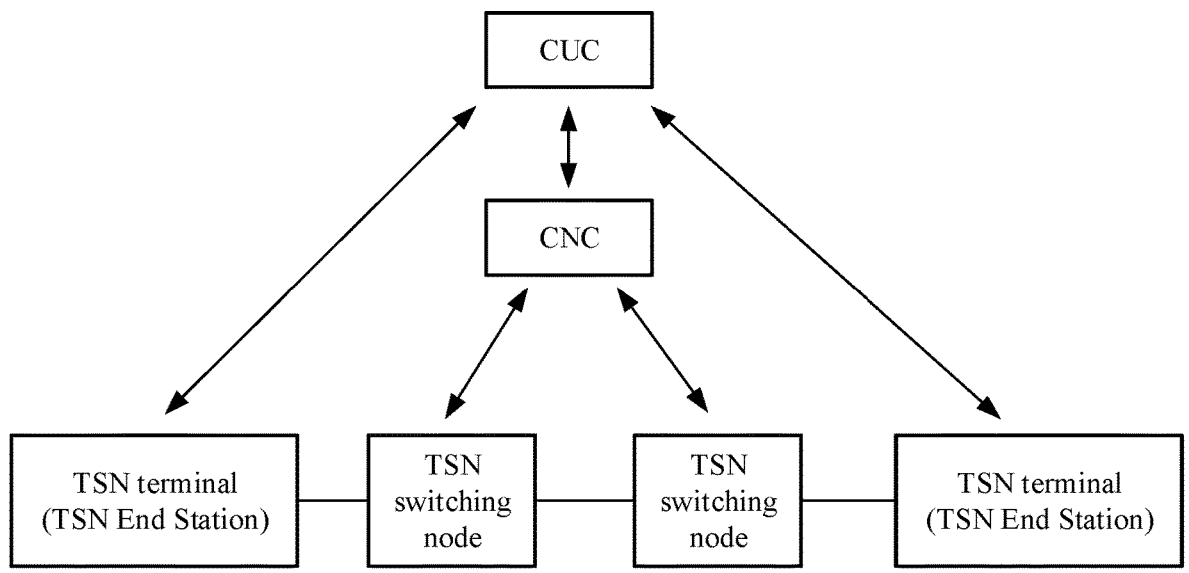
FIG. 2 is a schematic diagram of a fully centralized TSN system architecture.

The IEEE 802.1cc defines three TSN configuration models, one of which is a fully centralized TSN system architecture. FIG. 2 is a schematic diagram of a fully centralized TSN system architecture, including a TSN terminal (TSN End Station), a TSN switching node (TSN Bridge), a centralized user configuration (CUC) network element, and a centralized network configuration (CNC) network element. The CUC network element and the CNC network element are control plane network elements.

(1) The TSN terminal is a transmit end or a receive end of a data flow.

(2) The TSN switching node reserves a resource for a data flow as defined in TSN, and schedules and forwards a data packet.

(3) The CNC manages a topology of a TSN user plane and capability information of the TSN switching node (for example, a sending latency of the TSN switching node and an internal processing latency between ports of the TSN switching node), and generates a forwarding path of the data flow and processing policies (for example, a flow identifier, ports for receiving and sending a packet, a receiving time window, a sending time window, and a sending period) on the terminal and each TSN switching node based on a flow creation request provided by the CUC, and then delivers the processing policy on the TSN switching node to the corresponding TSN switching node.

(4) The CUC network element is configured to collect a flow creation request of the TSN terminal, for example, receive registration of a TSN transmit terminal (Talker) and a TSN receive terminal (Listener), receive flow information, and exchange a configuration parameter; and after matching requests of the TSN transmit terminal and the TSN receive terminal, request the CNC to create a data flow and confirm a processing policy generated by the CNC.

After creating a TSN flow forwarding rule, the CNC network element may determine a forwarding path of a flow on the TSN switching node by delivering a static filtering entry (Static filtering entries) to the TSN switching node. Information about the static filtering entry includes a destination medium access control (MAC) address of the TSN flow, an identifier of a receive port of the TSN flow on the TSN switching node, and an identifier of a transmit port of the TSN flow on the TSN switching node. Optionally, the information about the static filtering entry further includes a virtual local area network (VLAN) identifier (ID).

Figure 3:
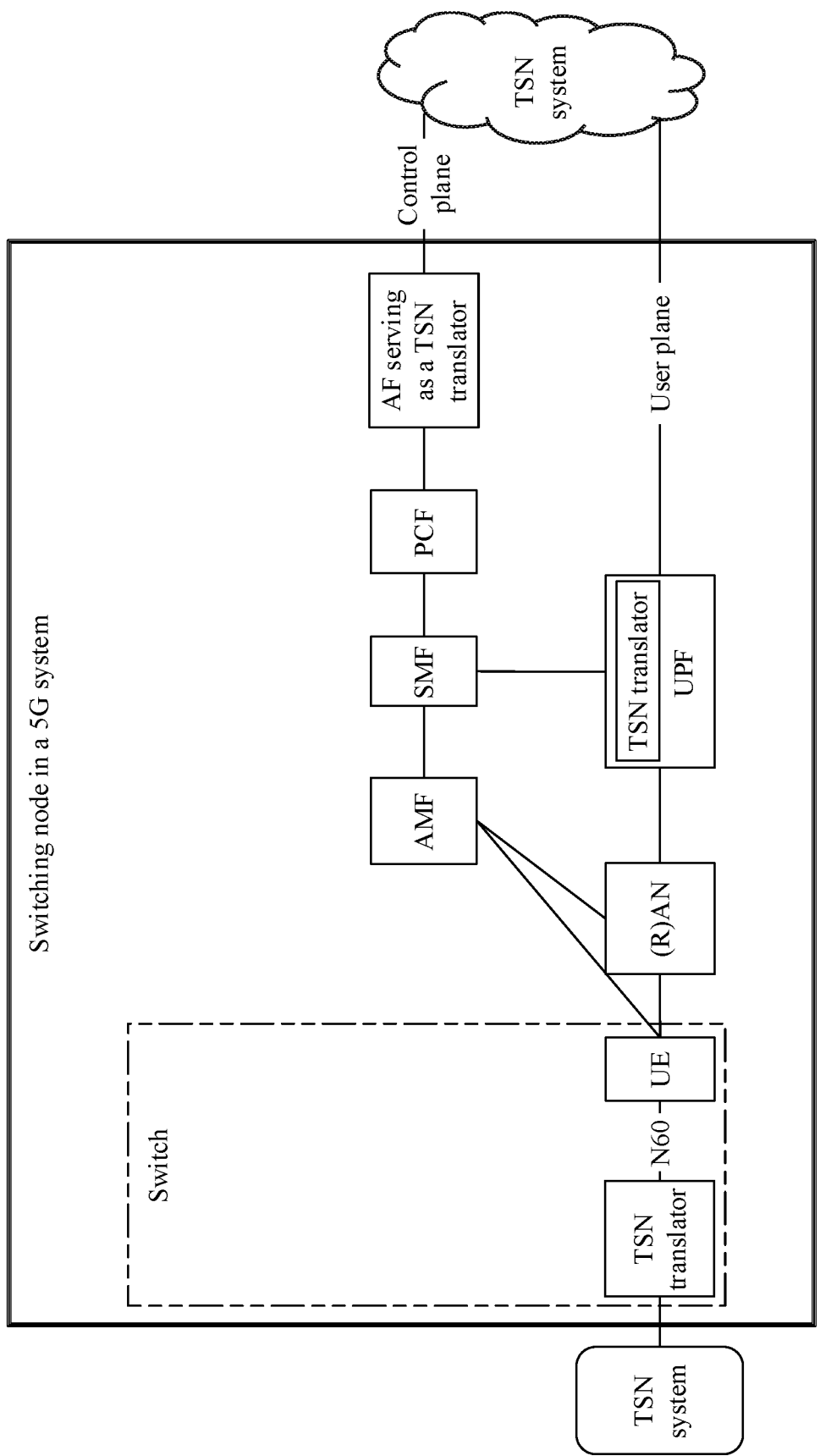
FIG. 3 is a schematic diagram of a system architecture in which a 3GPP network interworks with TSN.

FIG. 3 is a schematic diagram of a system architecture in which a 3GPP network interworks with TSN. That is, the 5G architecture shown in FIG. 1 is combined with the TSN architecture shown in FIG. 2, and a 3GPP 5G system and a TSN translator (TSN Translator) function as a logical TSN switching node (referred to as a switching node in a 5G system) as a whole. FIG. 3 shows only some network elements (that is, the AMF network element, the SMF network element, the PCF network element, the RAN, the UE, the AF network element, and the UPF network element) in the 5G architecture.

(1) On a control plane, the 5G system exchanges information with a node in a TSN system through the TSN translator (that is, the AF network element in 5G) on the control plane. The exchanged information includes switching capability information of the 5G system, TSN configuration information, time scheduling information of a TSN input/output port, time synchronization information, and the like.

(2) On a user plane, the UPF network element in the 5G system receives a downlink TSN flow from the TSN system or sends an uplink TSN flow to the TSN system through the TSN translator. The TSN translator may be integrated into the UPF network element or deployed independently of the UPF network element.

(3) On the user plane, the UE in the 5G system receives an uplink TSN flow from the TSN system or sends a downlink TSN flow to the TSN system through the TSN translator. The TSN translator may be integrated into the UE or deployed independently of the UE.

The solutions of this application are described for the network architecture shown in FIG. 3.

The user plane network element in this application is a network element that has a function of the UPF network element shown in FIG. 3. A TSN translator may be integrated into the user plane network element, or the TSN translator is deployed independently of the user plane network element. For ease of description, in this application, an example in which the TSN translator is integrated into the user plane network element is used for description. For ease of description, the user plane network element is referred to as a UPF in subsequent descriptions of this application. It should be noted that, in future communication, the user plane network element may still be referred to as a UPF network element, or may have another name. This is not limited in this application. The following UPF in this application may be replaced with a user plane network element.

The session management network element in this application is a network element that has a function of the SMF network element shown in FIG. 3 or FIG. 1. For ease of description, the session management network element is referred to as an SMF in subsequent descriptions of this application. It should be noted that, in future communication, the session management network element may still be referred to as an SMF network element, or may have another name. This is not limited in this application. The following SMF in this application may be replaced with a session management network element.

The policy control network element in this application is a network element that has a function of the PCF network element shown in FIG. 3 or FIG. 1. For ease of description, the policy control network element is referred to as a PCF in subsequent descriptions of this application. It should be noted that, in future communication, the policy control network element may still be referred to as a PCF network element, or may have another name. This is not limited in this application. The following PCF in this application may be replaced with a policy control network element.

The mobility management network element in this application is a network element that has a function of the AMF network element shown in FIG. 3 or FIG. 1. For ease of description, the mobility management network element is referred to as an AMF in subsequent descriptions of this application. It should be noted that, in future communication, the mobility management network element may still be referred to as an AMF network element, or may have another name. This is not limited in this application. The following AMF in this application may be replaced with a mobility management network element.

The application function network element in this application is a network element that has a function of the AF network element shown in FIG. 3 or FIG. 1. For ease of description, the application function network element is referred to as an AF in subsequent descriptions of this application. It should be noted that, in future communication, the application function network element may still be referred to as an AF network element, or may have another name. This is not limited in this application. The following AF in this application may be replaced with an application function network element.

The terminal device in this application is a device that has a function of the UE shown in FIG. 3. A TSN translator may be integrated into the terminal device, or the TSN translator is deployed independently of the terminal device. For ease of description, an example in which the TSN translator is integrated into the terminal device is used for description in this application. For ease of description, the terminal device is referred to as UE in subsequent descriptions of this application.

Figure 4:
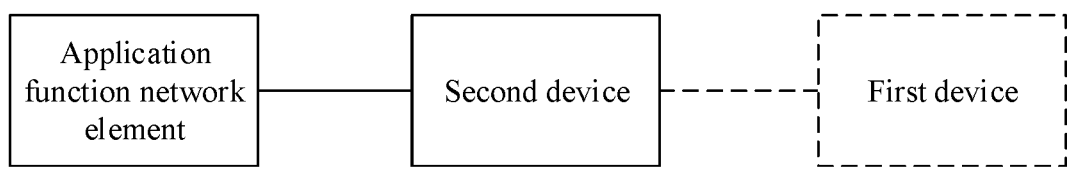
FIG. 4 is a schematic diagram of a communications system according to this application.

FIG. 4 is a schematic diagram of a communications system according to this application. The communications system includes a second device and an application function network element. The second device may be, for example, a session management network element, a policy control network element, or a user plane network element. Optionally, the communications system may further include a first device, and the first device may be a terminal device or a user plane network element. Specifically, when the first device is a terminal device, the second device may be a session management network element, a policy control network element, or a user plane network element. When the first device is a user plane network element, the second device may be a session management network element or a policy control network element.

The application function network element is configured to: receive processing policy information for a port from a centralized network configuration network element, where the processing policy information includes an identifier of the port; determine an identifier of a session of a terminal device based on the identifier of the port; and send the identifier of the terminal device and the processing policy information to the second device. The second device is configured to send the processing policy information to the first device corresponding to the session.

In a possible implementation, that the application function network element is configured to determine an identifier of a session of a terminal device based on the identifier of the port specifically include: when the identifier of the port is an identifier of a port of the terminal device, determining, based on the identifier of the port, the identifier that is of the session of the terminal device and that corresponds to the identifier of the port; or when the identifier of the port is an identifier of a port of a user plane network element, determining an identifier of a port of the terminal device based on the identifier of the port, and determining the identifier that is of the session of the terminal device and that corresponds to the identifier of the port of the terminal device.

In a possible implementation, the second device is further configured to determine a type of the first device, and the type of the first device is a terminal device or a user plane network element.

In a possible implementation, the application function network element is further configured to send first indication information to the second device. The first indication information is used to indicate a type of the first device, and the type of the first device is a terminal device or a user plane network element.

In a possible implementation, that the second device is configured to determine a type of the first device specifically includes: The second device is configured to determine the type of the first device based on the identifier of the port in the processing policy information.

In a possible implementation, the second device is further configured to send second indication information to the first device, and the second indication information is used to indicate that the processing policy information is policy information for the port.

In a possible implementation, the second device is a policy control network element. That the second device is configured to send the processing policy information to the first device corresponding to the session specifically includes: The second device is configured to send, through a session management network element, the processing policy information to the first device corresponding to the session.

In a possible implementation, the second device is a session management network element. That the second device is configured to send the processing policy information to the first device corresponding to the session specifically includes: The second device is configured to: when the first device is the user plane network element, send, through an N4 session of the terminal device or an interface at a device granularity between the second device and the first device, the processing policy information to the first device corresponding to the session; or when the first device is the terminal device, send, through a non-access stratum NAS message or a user plane network element, the processing policy information to the first device corresponding to the session.

In a possible implementation, the first device is configured to process a data flow of the port based on the processing policy information.

This application further provides another communications system. The communications system includes a first device and a second device. Optionally, the system further includes an application function network element. The first device may be a terminal device or a user plane network element, and the second device may be a user plane network element, a policy control network element, or a session management network element. When the second device is a user plane network element, the first device is a terminal device. When the second device is a policy control network element or a session management network element, the first device may be a terminal device or a user plane network element. The second device is configured to: receive an identifier of a session of a terminal device and processing policy information for a port, and send the processing policy information to the first device corresponding to the session. The first device is configured to process a data flow of the port based on the processing policy information.

In a possible implementation, the second device is further configured to: before sending the processing policy information to the first device corresponding to the session, determine a type of the first device. The type of the first device is a terminal device or a user plane network element.

In a possible implementation, that the second device is configured to determine a type of the first device specifically includes: The second device is configured to: determine the type of the first device based on an identifier of the port in the processing policy information; or receive first indication information, where the first indication information is used to indicate the type of the first device.

In a possible implementation, the second device is further configured to send second indication information to the first device, and the second indication information is used to indicate that the processing policy information is policy information for the port.

In a possible implementation, the second device is a policy control network element. That the second device is configured to receive an identifier of a session of a terminal device and processing policy information for a port specifically includes: The second device is configured to: receive the identifier of the session of the terminal device and the processing policy information for the port from the application function network element or a session management network element; and send, through the session management network element, the processing policy information to the first device corresponding to the session.

In a possible implementation, the second device is a session management network element. That the second device is configured to receive an identifier of a session of a terminal device and processing policy information for a port specifically includes: The second device is configured to: receive the identifier of the session of the terminal device and the processing policy information for the port from the application function network element; and when the first device is the user plane network element, send, through an N4 session of the terminal device or an interface at a device granularity between the second device and the first device, the processing policy information to the first device corresponding to the session; or when the first device is the terminal device, send, through a non-access stratum NAS message or a user plane network element, the processing policy information to the first device corresponding to the session.

In a possible implementation, the second device is a user plane network element, and the first device is the terminal device. That the second device is configured to receive an identifier of a session of a terminal device and processing policy information for a port specifically includes: The second device is configured to receive the identifier of the session of the terminal device and the processing policy information for the port from the application function network element.

In a possible implementation, the application function network element is configured to receive the processing policy information for the port from a centralized network configuration network element, where the processing policy information includes an identifier of the port; determine the identifier of the session of the terminal device based on the identifier of the port; and send the identifier of the terminal device and the processing policy information to the second device.

In a possible implementation, that the application function network element is configured to determine the identifier of the session of the terminal device based on the identifier of the port specifically includes: The application function network element is configured to: when the identifier of the port is an identifier of a port of the terminal device, determine, based on the identifier of the port, the identifier that is of the session of the terminal device and that corresponds to the identifier of the port; or when the identifier of the port is an identifier of a port of a user plane network element, determine an identifier of a port of the terminal device based on the identifier of the port, and determine the identifier that is of the session of the terminal device and that corresponds to the identifier of the port of the terminal device.

Figure 5:
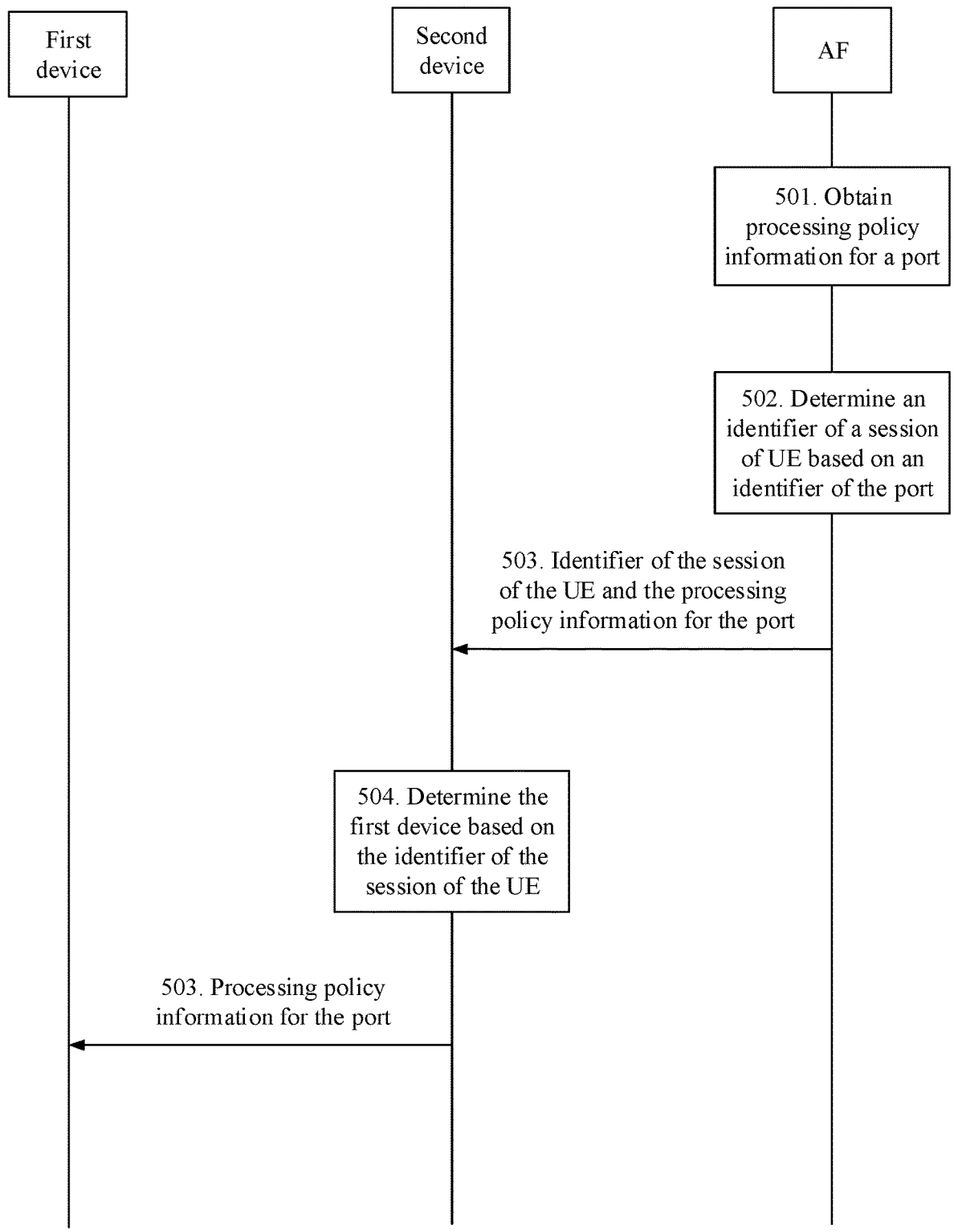
FIG. 5 is a schematic flowchart of a communications method according to this application.

To resolve the problem mentioned in the background, this application provides a communications method. As shown in FIG. 5, the method includes the following steps.

Step 501: An AF obtains processing policy information for a port.

For example, a CNC determines the processing policy information for the port, and then sends the processing policy information to the AF. The processing policy information includes an identifier of the port and a processing policy of a data flow.

In an implementation, the processing policy information may be processing policy information for a data flow. For example, the processing policy information may further include a priority list of the data flow. In this case, there is a correspondence between the processing policy of the data flow in the processing policy information and a priority of the data flow. Alternatively, it may be understood that a priority of a data flow corresponds to a processing policy of the data flow. For example, the priority list of the data flow includes a traffic class (Traffic class), one traffic class corresponds to one priority, and the processing policy of the data flow that corresponds to the priority of the data flow may be a gating control information list (which may also be referred to as a time slice or a scheduling time slice).

In another implementation, the processing policy of the data flow in the processing policy information may be a configuration policy of the port. For example, the configuration policy may be an enabling configuration, a VLAN configuration, or the like of a transmit port.

Step 502: The AF determines an identifier of a session of UE based on the identifier of the port.

After receiving the processing policy information, the AF obtains the identifier of the port from the processing policy information, and may further determine the identifier of the session of the UE (for example, a MAC address of the UE) based on the identifier of the port.

A manner in which the AF determines the identifier of the session of the UE based on the identifier of the port may be, for example, as follows:

(1) When the identifier of the port is an identifier of a port of the UE, the AF determines, based on the identifier of the port, the identifier that is of the session of the UE and that corresponds to the identifier of the port.

(2) When the identifier of the port is an identifier of a port of a UPF, the AF determines an identifier of a port of the UE based on the identifier of the port, and then determines the identifier that is of the session of the UE and that corresponds to the identifier of the port of the UE.

For example, the AF determines, based on a correspondence between the identifier of the port of the UPF and the identifier of the port of the UE, the identifier that is of the port of the UE and that corresponds to the identifier of the port of the UPF, and then determines, based on the identifier of the port of the UE, the identifier that is of the session of the UE and that corresponds to the identifier of the port of the UE.

In still another implementation, when the identifier of the port is an identifier of a port of a UPF, the AF selects an identifier of a port of the UE from identifiers that are of ports of the UE on a switching node in a 5G system and that are stored in the AF, and then determines the identifier that is of the session of the UE and that corresponds to the identifier of the port of the UE.

Step 503: The AF sends the processing policy information for the port and the identifier of the session of the UE to a second device. Correspondingly, the second device may receive the processing policy information for the port and the identifier of the session of the UE.

The second device herein may be a PCF, an SMF, or a UPF.

For example, when the second device is a PCF, the AF may directly send the processing policy information for the port and the identifier of the session of the UE to the PCF, or may send the processing policy information for the port and the identifier of the session of the UE to the PCF through an NEF.

For example, when the second device is an SMF, the AF may send the processing policy information for the port and the identifier of the session of the UE to the SMF through a PCF.

For another example, when the second device is a UPF, the AF may send the processing policy information for the port and the identifier of the session of the UE to the UPF through a PCF and an SMF, or may send the processing policy information for the port and the identifier of the session of the UE to the UPF through an SMF, or may directly send the processing policy information for the port and the identifier of the session of the UE to the UPF.

In an implementation, the AF may further send first indication information to the second device. The first indication information is used to indicate a type of a first device corresponding to the processing policy information, and the type may be UE or a UPF. Alternatively, it may be understood that the first indication information is used to indicate whether a port indicated by the identifier of the port in the processing policy information is a port of the UE or a port of the UPF. Alternatively, it may be understood that the first indication information is used to indicate whether the processing policy information is processing policy information for a port of the UPF or processing policy information for a port of the UE. Therefore, the second device may determine the type of the first device based on the first indication information, that is, determine whether the processing policy information needs to be sent to the UE or the UPF.

In another implementation, if the AF does not send the first indication information to the second device, the second device may obtain the identifier of the port by parsing the received processing policy information, and identify whether a port corresponding to the identifier of the port is a port of the UE or a port of the UPF, to determine whether the processing policy information needs to be sent to the UE or the UPF.

Step 504: The second device determines the first device based on the identifier of the session of the UE.

The first device may be UE or a UPF. For example, if the second device determines that the type of the first device is the UE, that is, determines that the processing policy information needs to be sent to the UE, in this step, the second device determines the UE based on the identifier of the session of the UE. For another example, if the second device determines that the type of the first device is the UPF, that is, determines that the processing policy information needs to be sent to the UPF, in this step, the second device determines the UPF based on the identifier of the session of the UE.

Step 505: The second device sends the processing policy information for the port to the first device. Correspondingly, the first device may receive the processing policy information for the port.

For example, if the second device is a PCF, the PCF may send, through an SMF, the processing policy information to the UE or the UPF corresponding to the session.

For example, if the second device is an SMF, and the first device is the UPF, the SMF may send, through an N4 session of the UE or an interface at a device granularity between the SMF and the UPF, the processing policy information to the UPF corresponding to the session.

For another example, if the second device is an SMF, and the first device is the UE, the SMF may send, through a NAS message or a UPF, the processing policy information to the UE corresponding to the session.

Optionally, the second device may further send second indication information to the first device, and the second indication information is used to indicate that the processing policy information is policy information for the port.

After receiving the processing policy information, the first device may configure a corresponding port (that is, a port corresponding to the identifier of the port of the processing policy information) based on the processing policy information, or may send the processing policy information to a TSN translator, and the TSN translator configures the port.

In this embodiment, based on an existing 5G management and forwarding architecture, a TSN management system configures a processing policy for a port on a switching node in a 5G system, so that the switching node in the 5G system is enabled to support a processing policy for a port that is defined in a TSN protocol.

With reference to a specific embodiment, the following describes a specific implementation process of sending a processing policy of a data flow to the UE and/or the UPF.

It should be noted that the following embodiment is described by using an example in which the processing policy information is data flow processing policy information (which may also be referred to as port data flow processing policy information or data flow processing policy information for a port). However, a specific implementation of the processing policy information is not limited in this application.

In the following embodiments shown in FIG. 6A and FIG. 6B to FIG. 8, an AF receives, from a TSN control plane, data flow processing policy information at a port granularity on a switching node in a 5G system. The data flow processing policy information at the port granularity is policy information based on which a port processes a data flow, for example, schedules the data flow based on an allocated time slice. The port granularity may be a physical port (for example, a physical network port or a virtual port), or may be a logical port (for example, a PDU session—granularity port or an internal port). The AF sends the data flow processing policy information at the port granularity to a PCF/an SMF/a UPF, and then creates a data flow processing policy at a port granularity on the UPF. Optionally, the AF further sends UE-side data flow processing policy information at a port granularity to UE, to determine a data flow processing policy of the UE for a TSN flow.

It should be noted that, in this application, that the data flow processing policy is sent to the UPF means that the data flow processing policy is sent to a port of the UPF or a port of a TSN translator corresponding to the UPF. The TSN translator may be disposed together with the UPF, or may be disposed separately. In this application, that the data flow processing policy is sent to the UE means that the data flow processing policy is sent to a port of the UE or a port of a TSN translator corresponding to the UE. The TSN translator may be disposed together with the UE, or may be disposed separately.

Figure 6A:
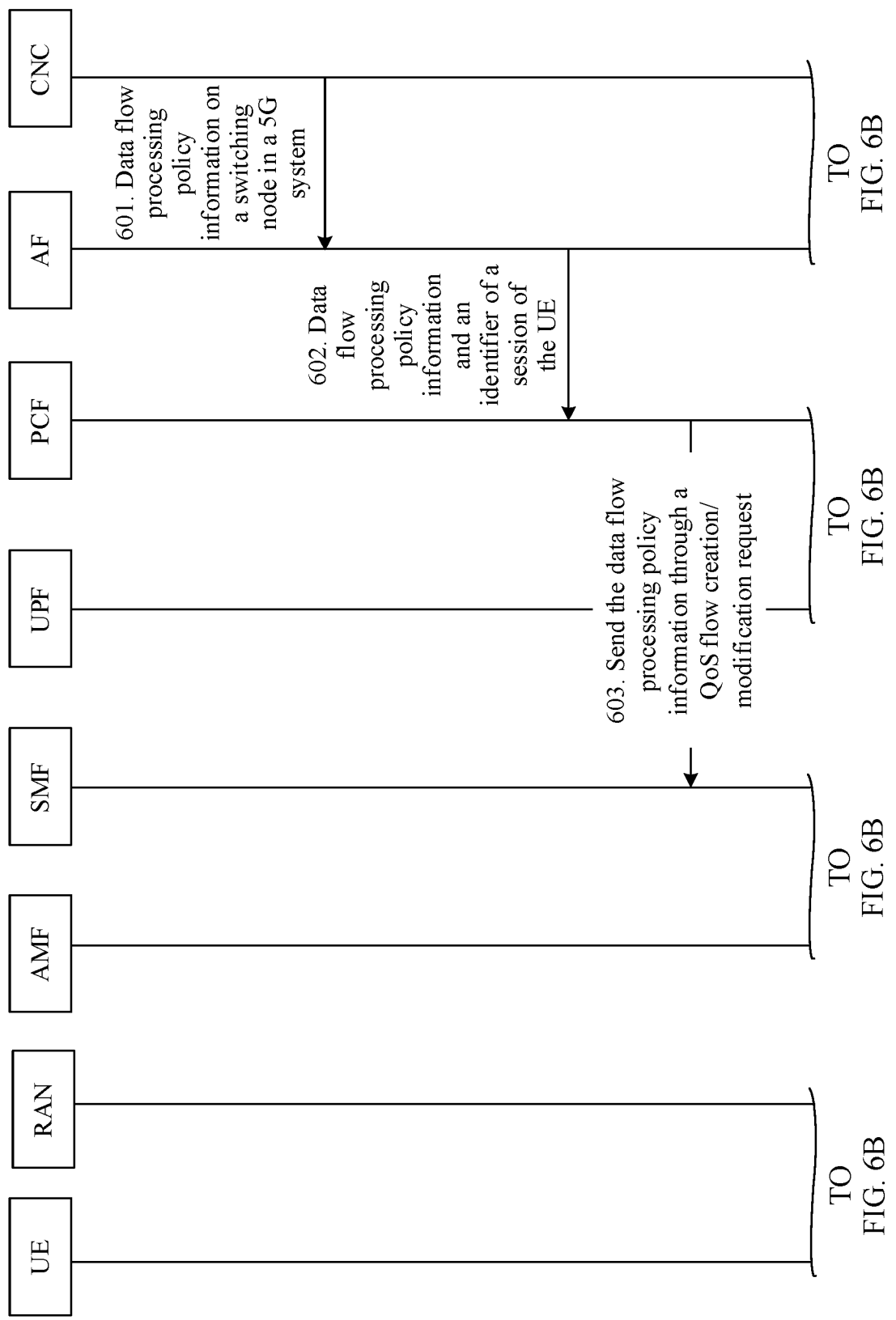

FIG. 6A and FIG. 6B are a schematic flowchart of another communications method according to this application. In this embodiment, a TSN control plane delivers a data flow processing policy at a port granularity on a switching node in a 5G system to a control plane network element AF on the switching node in the 5G system. After receiving the data flow processing policy, the AF sends the data flow processing policy to a PCF, to trigger the PCF to perform a QoS flow creation or update procedure. In the foregoing procedure, the data flow processing policy at the port granularity is configured for a port on the switching node in the 5G system. The port herein may be a port on a network side, for example, a port on a UPF side or a port of a TSN translator, or may be a port on a UE side, for example, a port on a UE side or a port of a TSN translator. In this way, a data flow processing policy at a port granularity is created on a user plane of the 5G system.

The method includes the following steps.

Step 601: A CNC sends data flow processing policy information on a switching node in a 5G system to an AF. Correspondingly, the AF may receive the data flow processing policy information on the switching node in the 5G system.

For a specific implementation of the data flow processing policy information, refer to related descriptions of the embodiment in FIG. 5. Details are not described herein again.

For example, if the data flow processing policy information is data flow processing policy information for a port of UE, an identifier of a port that is included in the data flow processing policy information is an identifier of a port of the UE or an identifier of a port of a TSN translator corresponding to the UE.

For another example, if the data flow processing policy information is data flow processing policy information for a port of a UPF, an identifier of a port that is included in the data flow processing policy information is an identifier of a port of the UPF or an identifier of a port of a TSN translator corresponding to the UPF.

Step 602: The AF sends an identifier of a session of the UE and the data flow processing policy information on the switching node in the 5G system to a PCF. Correspondingly, the PCF may receive the identifier of the session of the UE and the data flow processing policy information on the switching node in the 5G system.

After receiving the data flow processing policy information on the switching node in the 5G system from the CNC, the AF obtains the identifier of the port in the data flow processing policy information, then may determine the identifier of the session of the UE (which may be, for example, a MAC address of the UE) based on the identifier of the port, and send the identifier of the session of the UE and the data flow processing policy information to the PCF.

For a specific manner in which the AF determines the identifier of the session of the UE based on the identifier of the port, refer to related descriptions in the embodiment in FIG. 5. Details are not described herein again.

In an implementation, in step 602, the AF may further send first indication information to the PCF. For a function of the first indication information, refer to the description of the function of the first indication information in the embodiment in FIG. 5. Details are not described herein again.

In conclusion, in actual application, there are at least two methods in which the AF sends the data flow processing policy information to the PCF.

Method 1: The AF sends the identifier of the session of the UE and the data flow processing policy information on the switching node in the 5G system to the PCF.

In this implementation, the PCF may parse the data flow processing policy information to obtain the identifier of the port, and further determine whether a port corresponding to the identifier of the port is a port of the UE or a port of the UPF.

Method 2: The AF sends the identifier of the session of the UE and the data flow processing policy information on the switching node in the 5G system, and the first indication information to the PCF.

The data flow processing policy information is encapsulated by the AF into a transparent container, and the PCF cannot parse the data flow processing policy information, or the PCF can parse the data flow processing policy information but cannot identify whether a port in the data flow processing policy information is a port of the UE or a port of the UPF. In this case, the PCF may determine, based on the first indication information, whether the data flow processing policy information is data flow processing policy information for the UE or data flow processing policy information for the UPF.

In this step, the AF may directly send the identifier of the session of the UE and the data flow processing policy information to the PCF, or may send the identifier of the session of the UE and the data flow processing policy information to the PCF through an NEF.

Step 603: The PCF initiates a QoS flow creation/modification procedure, and sends the data flow processing policy information to an SMF through a QoS flow creation/modification request message.

After receiving the identifier of the session of the UE and the data flow processing policy information, the PCF initiates the QoS flow creation/modification procedure based on the identifier of the session of the UE, and then sends the data flow processing policy information to the SMF through the QoS flow creation/modification request message.

If a port indicated by the identifier of the port is a port of the UPF, the following step 604 and step 605 are performed. If a port indicated by the identifier of the port is a port of the UE, the following step 606 and step 607 are performed.

Step 604: The SMF sends the data flow processing policy information to the UPF through an N4 session creation/modification request message.

Optionally, the SMF further sends second indication information to the UPF, and the second indication information is used to indicate that the data flow processing policy information is applied to a local port of the UPF instead of a session of the UE. Alternatively, it may be understood that the indication information is used to indicate that the data flow processing policy information is policy information for a port.

Step 605: The UPF processes a TSN flow based on the data flow processing policy information.

To be specific, after receiving the data flow processing policy information, the UPF configures a processing policy in the data flow processing policy information for the port, or sends the data flow processing policy information to a TSN translator, and the TSN translator configures the data flow processing policy information for the port.

For example, the data flow processing policy information includes an identifier of a port, a priority list of a data flow, and a processing policy (for example, a gating control information list) corresponding to a priority of the data flow. Therefore, a port indicated by the data flow processing policy information processes the TSN flow based on the processing policy corresponding to the priority of the data flow, for example, sends the TSN flow in a time slice corresponding to the priority of the data flow.

Step 606: The SMF sends the data flow processing policy information to the UE.

For example, the SMF sends a PDU session modification request message to the UE, and the PDU session modification request message carries the data flow processing policy information. To be specific, the SMF may send the data flow processing policy information to the UE through the UPF, or the SMF may send the data flow processing policy information to the UE through a non-access stratum (NAS) message.

Optionally, the SMF further sends second indication information to the UE, and the second indication information is used to indicate that the data flow processing policy information is applied to a local port of the UE instead of a session of the UE. Alternatively, it may be understood that the indication information is used to indicate that the data flow processing policy information is policy information for a port.

Step 607: The UE processes the TSN flow based on the data flow processing policy information.

To be specific, after receiving the data flow processing policy information, the UE configures a processing policy in the data flow processing policy information for the port, or sends the data flow processing policy information to the TSN translator, and the TSN translator configures the data flow processing policy information for the port.

For example, the data flow processing policy information includes an identifier of a port, a priority list of a data flow, and a processing policy (for example, a gating control information list) corresponding to a priority of the data flow. Therefore, a port indicated by the data flow processing policy information processes the TSN flow based on the processing policy corresponding to the priority of the data flow, for example, sends the TSN flow in a time slice corresponding to the priority of the data flow.

It should be noted that, in another implementation, if the data flow processing policy information received by the AF from the CNC includes both data flow processing policy information for the port of the UPF and data flow processing policy information for the port of the UE, the SMF may subsequently send the data flow processing policy information for the port of the UPF to the UPF in a manner similar to that in step 604 and step 605, and send the data flow processing policy information for the port of the UE to the UE in a manner similar to step 606 and step 607.

In this embodiment, based on an existing 5G management and forwarding architecture, a TSN management system configures a data flow processing policy at a port granularity on a switching node in a 5G system, so that the switching node in the 5G system is enabled to support a data flow processing policy at a port granularity that is defined in a TSN protocol.

Figure 7A:
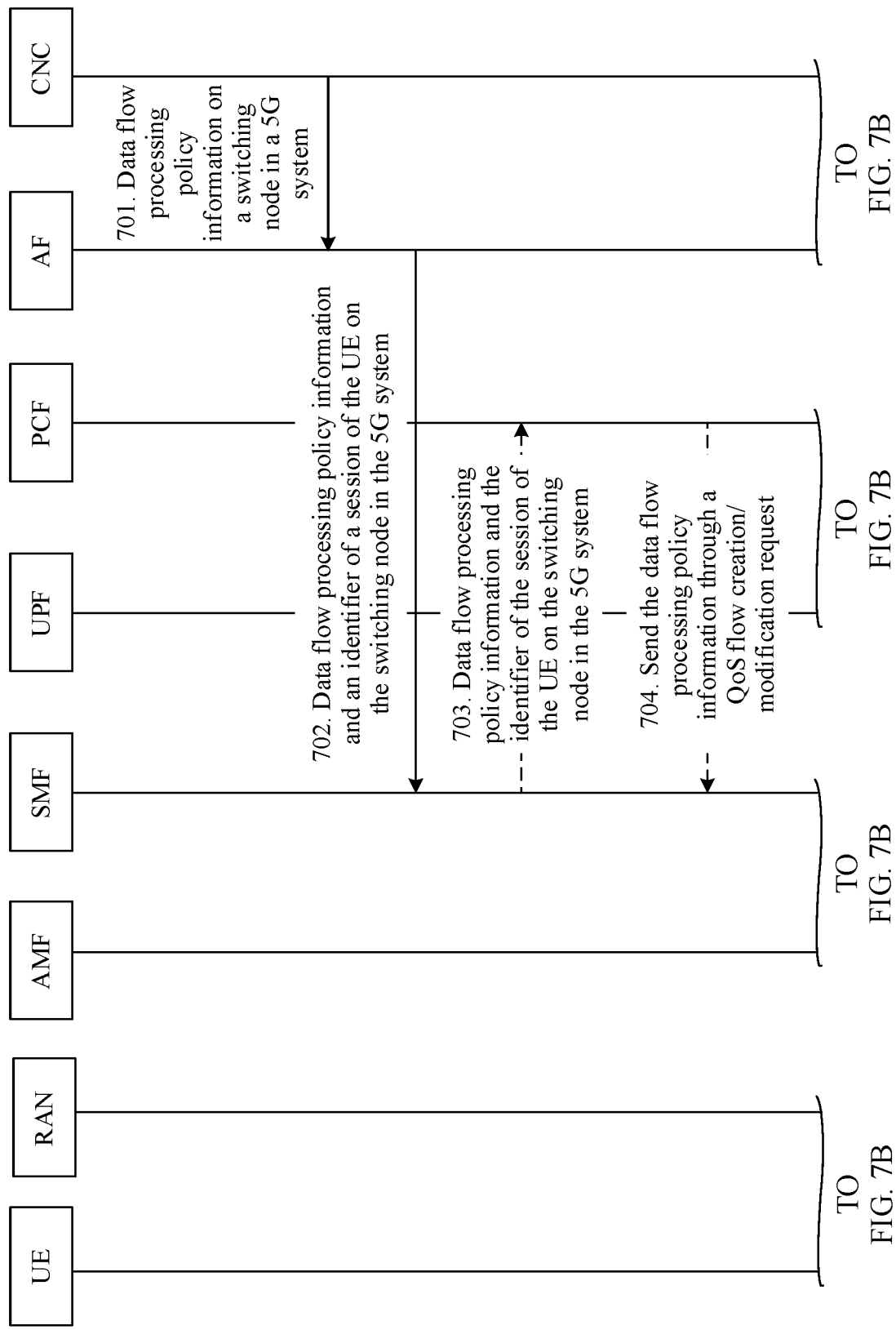
FIG. 7A and FIG. 7B are a schematic flowchart of another communications method according to this application.
Figure 7B:
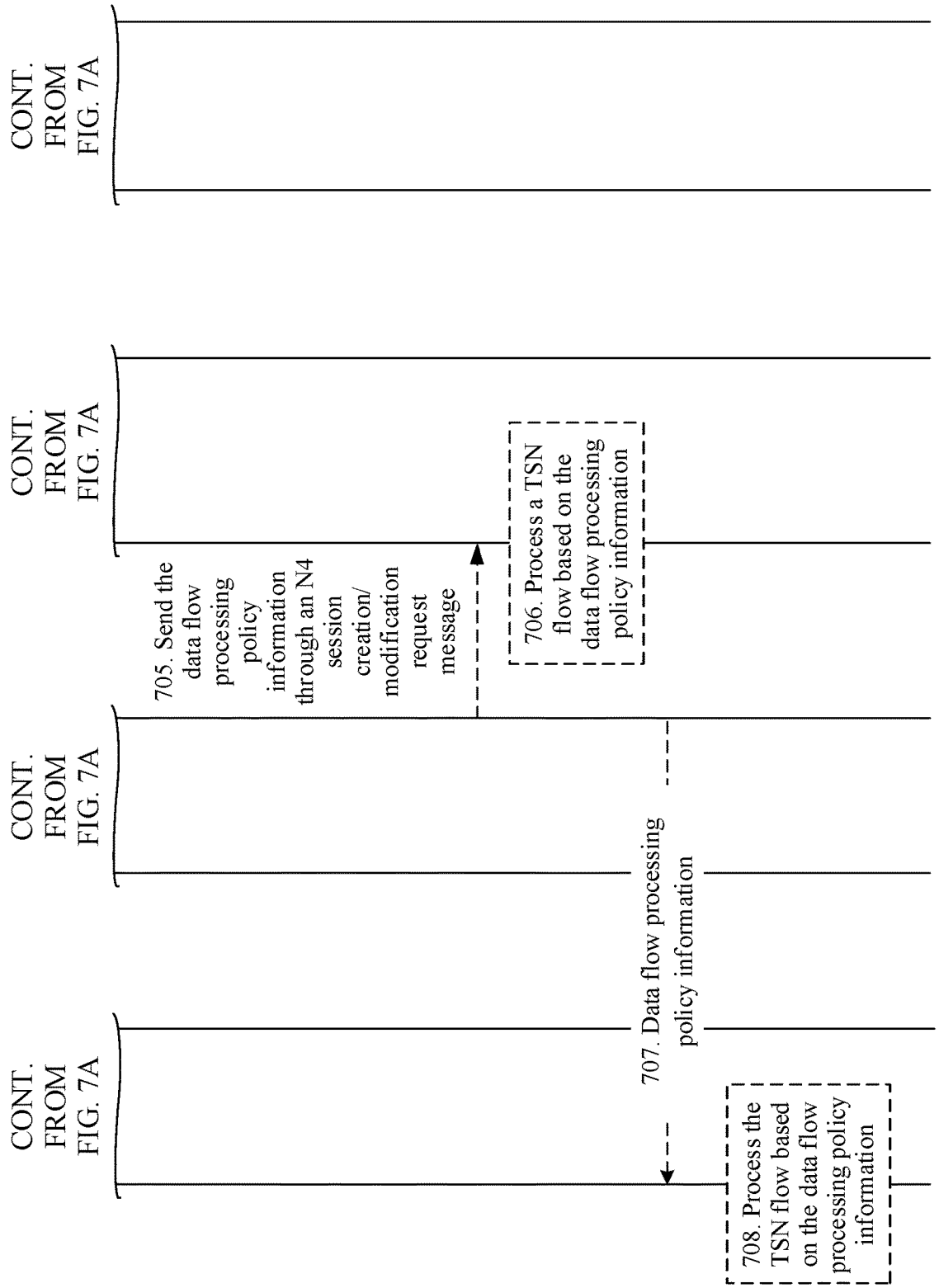

FIG. 7A and FIG. 7B are a schematic flowchart of another communications method according to this application. In this embodiment, a TSN control plane delivers a data flow processing policy at a port granularity on a switching node in a 5G system to a control plane network element AF on the switching node in the 5G system. After receiving the data flow processing policy, the AF sends the data flow processing policy to an SMF, and then the SMF triggers a QoS flow creation/modification procedure. In this procedure, the data flow processing policy at the port granularity is configured for a port on the switching node in the 5G system, or the SMF directly creates the data flow processing policy at the port granularity on the switching node in the 5G system. The port herein may be a port of a UPF or a port of a TSN translator, or may be a port of UE or a port of a TSN translator. In this way, a data flow processing policy at a port granularity is created on a user plane of the 5G system.

The method includes the following steps.

Step 701 is the same as step 601 in the embodiment in FIG. 6A and FIG. 6B. For details, refer to the foregoing description.

Step 702: The AF sends an identifier of a session of the UE and the data flow processing policy information on the switching node in the 5G system to an SMF. Correspondingly, the SMF may receive the identifier of the session of the UE and the data flow processing policy information on the switching node in the 5G system.

In this step, the AF may send the identifier of the session of the UE and the data flow processing policy information to the SMF through a user session.

The data flow processing policy information herein is the same as the data flow processing policy information described in step 602 in the embodiment in FIG. 6A and FIG. 6B. For details, refer to the foregoing description.

In an implementation, in step 702, the AF may further send first indication information to the SMF. For a function of the first indication information, refer to the description of the function of the first indication information in the embodiment in FIG. 5. Details are not described herein again.

Step 703: The SMF sends the identifier of the session of the UE and the data flow processing policy information on the switching node in the 5G system to a PCF, to trigger a QoS flow creation/modification procedure.

In this step, the SMF may directly forward, to the PCF, a message that is received from the AF and that carries the identifier of the session and the data flow processing policy information, or send the identifier of the session and the data flow processing policy information through an information element defined between the SMF and the PCF.

Optionally, if the SMF receives the first indication information in step 702, the SMF further sends the first indication information to the PCF in this step.

Step 704 to step 708 are the same as step 603 to step 607 in the embodiment in FIG. 6A and FIG. 6B. For details, refer to the foregoing descriptions.

It should be noted that step 703 and step 704 are optional steps. To be specific, when step 703 and step 704 are performed, the SMF triggers the PCF to initiate a QoS flow creation/modification procedure, to create a data flow processing policy at a port granularity in the 5G system. When step 703 and step 704 are not performed, the SMF directly creates a data flow processing policy at a port granularity in the 5G system.

It should be noted that, if step 703 and step 704 are not performed, in actual application, in step 702, there are at least the following two methods in which the AF sends the data flow processing policy information to the SMF.

Method 1: The AF sends the identifier of the session of the UE and the data flow processing policy information on the switching node in the 5G system to the SMF.

In this implementation, the SMF may parse the data flow processing policy information to obtain the identifier of the port, and further determine whether a port corresponding to the identifier of the port is a port of the UE or a port of the UPF.

Method 2: The AF sends the identifier of the session of the UE and the data flow processing policy information on the switching node in the 5G system, and the first indication information to the SMF.

The data flow processing policy information may be encapsulated by the AF into a transparent container, and the SMF cannot parse the data flow processing policy information, or the SMF can parse the data flow processing policy information but cannot identify whether a port in the data flow processing policy information is a port of the UE or a port of the UPF. In this case, the SMF may determine, based on the first indication information, whether the data flow processing policy information is data flow processing policy information for the UE or data flow processing policy information for the UPF. Further, the UE or the UPF is determined based on the identifier of the session of the UE.

It should be noted that, in another implementation, if the data flow processing policy information received by the AF from the CNC includes both data flow processing policy information for the port of the UPF and data flow processing policy information for the port of the UE, the SMF may subsequently send the data flow processing policy information for the port of the UPF to the UPF in a manner similar to that in step 705 to and step 706, and send the data flow processing policy information for the port of the UE to the UE in a manner similar to that in step 707 and step 708.

In an alternative implementation solution, if the data flow processing policy information in step 701 is the data flow processing policy information for the port of the UPF, in step 702, the AF may not send the identifier of the session of the UE and the data flow processing policy information to the SMF through a session. For example, the AF may determine the SMF based on a correspondence between the switching node in the 5G system and the SMF (or a correspondence between the UPF and the SMF) or a correspondence between the identifier of the port and the SMF, and then directly send the data flow processing policy information to the SMF. In this case, step 703 and step 704 do not need to be performed. Then, the SMF directly sends the data flow processing policy information to the UPF corresponding to the SMF (for example, may send the data flow processing policy information to the UPF through an interface at a device granularity), and then the UPF performs step 706. In this case, step 707 and step 708 do not need to be performed.

In this embodiment, based on an existing 5G management and forwarding architecture, a TSN management system configures a data flow processing policy at a port granularity on a switching node in a 5G system, so that the switching node in the 5G system is enabled to support a data flow processing policy at a port granularity that is defined in a TSN protocol.

Figure 8:
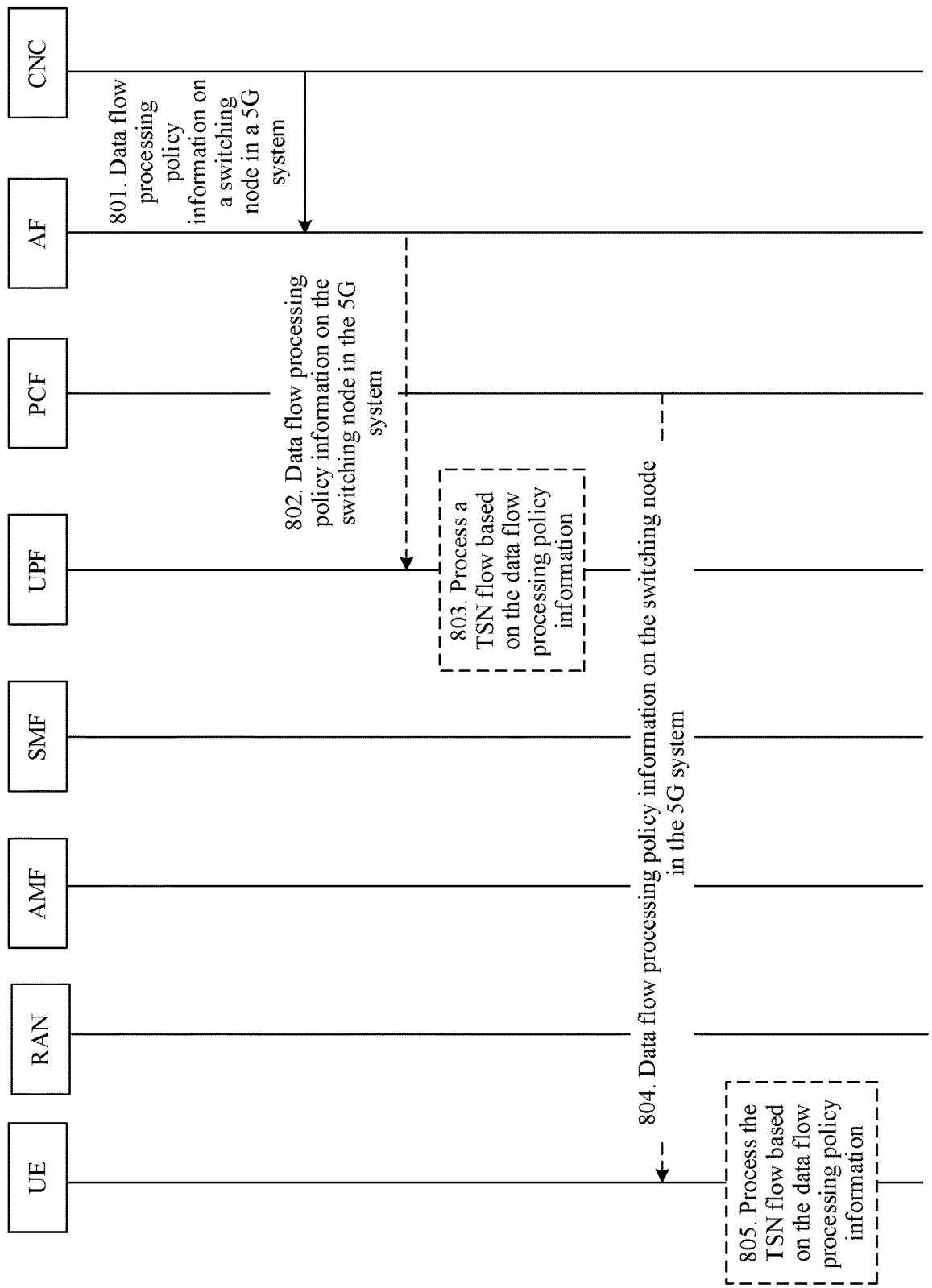
FIG. 8 is a schematic flowchart of another communications method according to this application.

FIG. 8 is a schematic flowchart of another communications method according to this application. In this embodiment, a TSN control plane delivers a data flow processing policy at a port granularity on a switching node in a 5G system to a control plane network element AF on the switching node in the 5G system. After receiving the data flow processing policy, the AF sends the data flow processing policy to a UPF. If the data flow processing policy is a data flow processing policy for a port of the UPF, the UPF directly creates a data flow processing policy at a port granularity (corresponding to step 803). If the data flow processing policy is a data flow processing policy for a port of UE, the UPF sends the data flow processing policy for the port of the UE through the user plane, so that the UE creates a data flow processing policy at a port granularity (corresponding to step 804 and step 805). In this way, a data flow processing policy at a port granularity is created in the 5G system.

The method includes the following steps.

Step 801 is the same as step 701 in the embodiment in FIG. 7A and FIG. 7B.

Step 802: The AF sends the data flow processing policy information on the switching node in the 5G system to a UPF.

The data flow processing policy information herein may be data flow processing policy information for a port of the UPF, or may be data flow processing policy information for a port of the UE.

After receiving the data flow processing policy information, the UPF may parse the data flow processing policy information to obtain the identifier of the port, and identify whether the port is a port of the UE or a port of the UPF. If the port is a port of the UPF, step 803 is performed. If the port is a port of the UE, step 804 and step 805 are performed.

Step 803 is the same as step 706 in the embodiment in FIG. 7A and FIG. 7B. For details, refer to the foregoing description.

Step 804 and step 805 are the same as step 707 and step 708 in the embodiment in FIG. 7A and FIG. 7B. For details, refer to the foregoing descriptions.

It should be noted that, in another implementation, if the data flow processing policy information received by the AF from the CNC includes both data flow processing policy information for the port of the UPF and data flow processing policy information for the port of the UE, the UPF may subsequently configure the data flow processing policy in a manner similar to step 803, and configure the data flow processing policy of the UE in a manner similar to step 804 and step 805.

It should be noted that, if the data flow processing policy information is data flow processing policy information for the port of the UE, in step 802, the AF may also send the identifier of the session of the UE and the data flow processing policy information to the UPF. For a specific manner in which the AF generates the identifier of the session of the UE, refer to related descriptions in the embodiment in FIG. 6A and FIG. 6B. Therefore, after receiving the identifier of the session of the UE and the data flow processing policy information, the UPF may determine the UE based on the identifier of the session of the UE, and then directly send the data flow processing policy information to the UE. In this case, the UPF does not need to parse the data flow processing policy information. Alternatively, after receiving the identifier of the session of the UE and the data flow processing policy information, the UPF sends the identifier of the session of the UE and the data flow processing policy information to the SMF, and then the SMF may configure the data flow processing policy information for the UE according to the method in the embodiment shown in FIG. 7A and FIG. 7B. For example, the SMF configures the data flow processing policy information for the UE through a NAS message.

In this embodiment, based on an existing 5G management and forwarding architecture, a TSN management system configures a data flow processing policy at a port granularity on a switching node in a 5G system, so that the switching node in the 5G system is enabled to support a data flow processing policy at a port granularity that is defined in a TSN protocol.

The solutions provided in this application are described above mainly from a perspective of interaction between the network elements. It may be understood that the network elements include corresponding hardware structures and/or software modules for performing the foregoing functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 9:
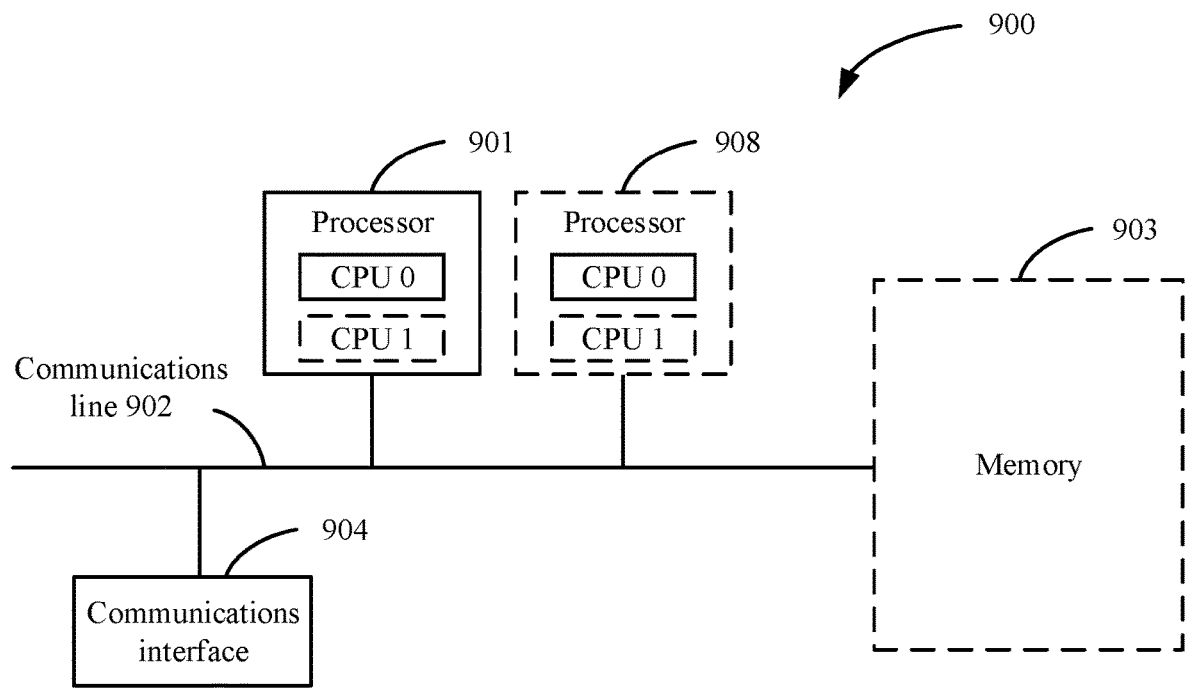
FIG. 9 is a schematic diagram of a communications apparatus according to this application.

Based on a same inventive concept, FIG. 9 is a schematic diagram of a communications apparatus according to this application. The apparatus may be a second device (for example, a user plane network element, a session management network element, or a policy control network element), an application function network element, or a chip, and may perform the method performed by the application function network element or the second device in any one of the foregoing embodiments.

The communications apparatus 900 includes at least one processor 901, a communications line 902, and at least one communications interface 904. During specific implementation, in an embodiment, the communications apparatus 900 may further include a memory 903. Certainly, the memory 903 may exist independently, and is connected to the processor 901 through the communications line. Alternatively, the memory 903 may be integrated into the processor 901. If the processor 901 needs program code, the memory may store program code and transmit the program code to the processor 901, so that the processor 901 implements this embodiment of the present invention according to an indication of the program code. The processor 901 may be a general-purpose central processing unit (CPU), a microprocessor, an application-specific integrated circuit (ASIC), or one or more integrated circuits for controlling program execution of the solutions of this application.

The communications line 902 may include a path for transmitting information between the foregoing components.

The communications interface 904 uses any transceiver-type apparatus, to communicate with another device or a communications network such as the Ethernet, a radio access network (RAN), a wireless local area network (WLAN), or a wired access network.

The memory 903 may be a read-only memory (ROM) or another type of static storage device capable of storing static information and instructions, or a random access memory (RAM) or another type of dynamic storage device capable of storing information and instructions. Alternatively, the memory 133 may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited herein.

The memory 903 is configured to store a computer-executable instruction for executing the solutions in this application, and the processor 901 controls the execution of the computer-executable instruction. The processor 901 is configured to execute the computer-executable instruction stored in the memory 903, to implement the communications method provided in the following embodiments of this application.

Optionally, the computer-executable instruction in this embodiment of this application may also be referred to as application program code. This is not specifically limited in this embodiment of this application.

During specific implementation, in an embodiment, the processor 901 may include one or more CPUs, for example, a CPU 0 and a CPU 1 in FIG. 9.

During specific implementation, in an embodiment, the communications apparatus 900 may include a plurality of processors, for example, the processor 901 and a processor 908 in FIG. 9. Each of the processors may be a single-core (single-CPU) processor, or may be a multi-core (multi-CPU) processor. The processor herein may be one or more devices, circuits, and/or processing cores for processing data (for example, a computer program instruction).

When the communications apparatus 900 shown in FIG. 9 is a chip, for example, may be a chip of an application function network element or a chip of a second device, the chip includes a processor 901 (and may further include a processor 908), a communications line 902, a memory 903, and a communications interface 904. Specifically, the communications interface 904 may be an input interface, a pin, a circuit, or the like. The memory 903 may be a register, a cache, or the like. The processor 901 and the processor 908 each may be a general-purpose CPU, a microprocessor, an ASIC, or one or more integrated circuits configured to control program execution of the communications method in any one of the foregoing embodiments.

Figure 10:
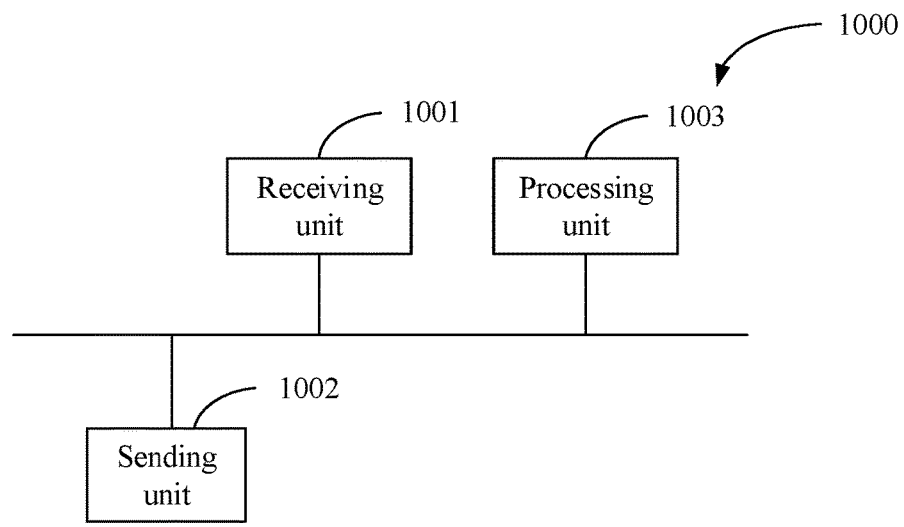
FIG. 10 is a schematic diagram of another communications apparatus according to this application.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, module division is an example, and is merely a logical function division. During actual implementation, another division manner may be used. For example, when each function module is obtained through division based on each corresponding function, FIG. 10 is a schematic diagram of a communications apparatus. The communications apparatus 1000 may be a second device (for example, a user plane network element, a policy control network element, or a session management network element) in the foregoing embodiments. The communications apparatus 1000 includes a receiving unit 1001, a sending unit 1002, and a processing unit 1003.

The communications apparatus 1000 may implement the following operations:

The receiving unit 1001 is configured to receive an identifier of a session of a terminal device and processing policy information for a port. The sending unit 1002 is configured to send the processing policy information to a first device corresponding to the session.

In a possible implementation, the processing unit 1003 is configured to: before the sending unit 1002 sends the processing policy information to the first device corresponding to the session, determine a type of the first device. The type of the first device is a terminal device or a user plane network element.

In a possible implementation, the processing unit 1003 is specifically configured to: determine the type of the first device based on an identifier of the port in the processing policy information; or receive first indication information through the receiving unit, where the first indication information is used to indicate the type of the first device.

In a possible implementation, the processing policy information includes the identifier of the port and a processing policy of a data flow.

In a possible implementation, the sending unit 1002 is further configured to send second indication information to the first device, and the second indication information is used to indicate that the processing policy information is policy information for the port.

In a possible implementation, the apparatus is a policy control network element. The receiving unit 1001 is specifically configured to receive the identifier of the session of the terminal device and the processing policy information for the port from an application function network element or a session management network element. The sending unit 1002 is specifically configured to send, through the session management network element, the processing policy information to the first device corresponding to the session.

In a possible implementation, the apparatus is a session management network element. The receiving unit 1001 is specifically configured to receive the identifier of the session of the terminal device and the processing policy information for the port from an application function network element. The sending unit 1002 is specifically configured to: when the first device is the user plane network element, send, through an N4 session of the terminal device or an interface at a device granularity between the second device and the first device, the processing policy information to the first device corresponding to the session; or when the first device is the terminal device, send, through a non-access stratum NAS message or a user plane network element, the processing policy information to the first device corresponding to the session.

In a possible implementation, the apparatus is a user plane network element, and the first device is the terminal device. The receiving unit 1001 is specifically configured to receive the identifier of the session of the terminal device and the processing policy information for the port from an application function network element.

It should be understood that the communications apparatus 1000 may be configured to implement the steps performed by the second device in the methods in the embodiments of the present invention. For related features, refer to the foregoing descriptions. Details are not described herein again.

If the communications apparatus 1000 is a second device, the second device is presented in a form of function modules obtained through division in an integrated manner. The "module" herein may be a specific ASIC, a circuit, a processor that executes one or more software or firmware programs, a memory, an integrated logic circuit, and/or another device that can provide the foregoing functions.

Specifically, functions/implementation processes of the receiving unit 1001, the processing unit 1003, and the sending unit 1002 in FIG. 10 may be implemented by the processor 901 in FIG. 9 by invoking the computer-executable instruction stored in the memory 903. Alternatively, a function/an implementation process of the processing unit 1003 in FIG. 10 may be implemented by the processor 901 in FIG. 9 by invoking the computer-executable instruction stored in the memory 903, and functions/implementation processes of the receiving unit 1001 and the sending unit 1002 in FIG. 10 may be implemented through the communications interface 904 in FIG. 9.

Optionally, when the communications apparatus 1000 is a chip or a circuit, functions/implementation processes of the receiving unit 1001 and the sending unit 1002 may alternatively be implemented by a pin, a circuit, or the like. Optionally, when the communications apparatus 1000 is a chip, the memory 903 may be a storage unit in the chip, for example, a register or a cache.

Certainly, when the communications apparatus 1000 is a second device, the memory 903 may be a storage unit that is in the second device and that is located outside a chip. This is not specifically limited in this embodiment of this application.

Figure 11:
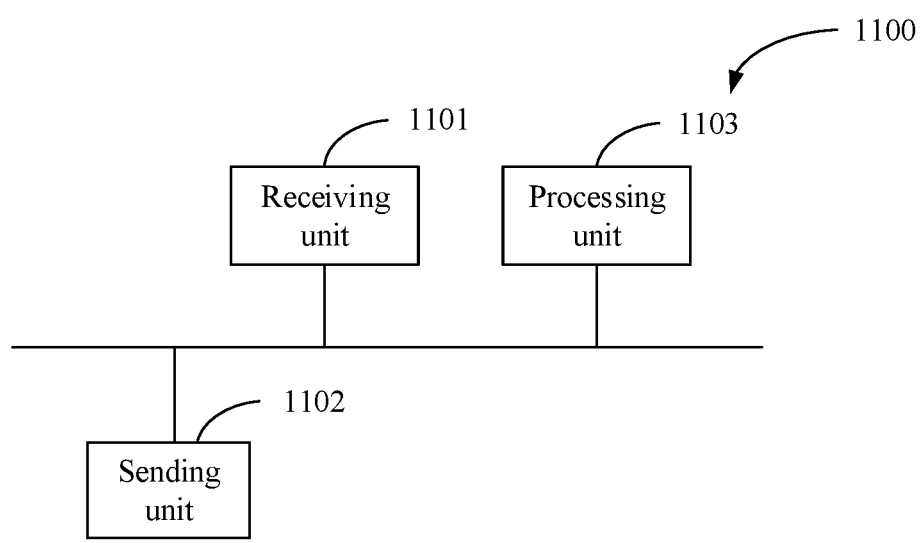
FIG. 11 is a schematic diagram of another communications apparatus according to this application.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, module division is an example, and is merely a logical function division. During actual implementation, another division manner may be used. For example, when each function module is obtained through division based on each corresponding function, FIG. 11 is a schematic diagram of a communications apparatus. The communications apparatus 1100 may be an application function network element in the foregoing embodiments. The communications apparatus 1100 includes a receiving unit 1101, a sending unit 1102, and a processing unit 1103.

The communications apparatus 1100 may implement the following operations:

The receiving unit 1101 is configured to receive processing policy information for a port from a centralized network configuration network element, and the processing policy information includes an identifier of the port. The processing unit 1103 is configured to determine an identifier of a session of a terminal device based on the identifier of the port, and the identifier of the session of the terminal device is used to determine a first device. The sending unit 1102 is configured to send the identifier of the terminal device and the processing policy information to a second device.

In a possible implementation, the processing policy further includes a processing policy of a data flow.

In a possible implementation, the processing unit 1103 is specifically configured to: when the identifier of the port is an identifier of a port of the terminal device, determine, based on the identifier of the port, the identifier that is of the session of the terminal device and that corresponds to the identifier of the port; or when the identifier of the port is an identifier of a port of a user plane network element, determine an identifier of a port of the terminal device based on the identifier of the port, and determine the identifier that is of the session of the terminal device and that corresponds to the identifier of the port of the terminal device.

In a possible implementation, the sending unit 1102 is further configured to send indication information to the second device. The indication information is used to indicate a type of the first device, and the type of the first device is a terminal device or a user plane network element.

It should be understood that the communications apparatus 1100 may be configured to implement the steps performed by the application function network element in the methods in the embodiments of the present invention. For related features, refer to the foregoing descriptions. Details are not described herein again.

If the communications apparatus 1100 is an application function network element, the application function network element is presented in a form of function modules obtained through division in an integrated manner. The "module" herein may be a specific ASIC, a circuit, a processor that executes one or more software or firmware programs, a memory, an integrated logic circuit, and/or another device that can provide the foregoing functions.

Specifically, functions/implementation processes of the receiving unit 1101, the processing unit 1103, and the sending unit 1102 in FIG. 11 may be implemented by the processor 901 in FIG. 9 by invoking the computer-executable instruction stored in the memory 903. Alternatively, a function/an implementation process of the processing unit 1103 in FIG. 11 may be implemented by the processor 901 in FIG. 9 by invoking the computer-executable instruction stored in the memory 903, and functions/implementation processes of the receiving unit 1101 and the sending unit 1102 in FIG. 11 may be implemented through the communications interface 904 in FIG. 9.

Optionally, when the communications apparatus 1100 is a chip or a circuit, functions/implementation processes of the receiving unit 1101 and the sending unit 1102 may alternatively be implemented by a pin, a circuit, or the like. Optionally, when the communications apparatus 1100 is a chip, the memory 903 may be a storage unit in the chip, for example, a register or a cache.

Certainly, when the communications apparatus 1100 is an application function network element, the memory 903 may be a storage unit that is in the application function network element and that is located outside a chip. This is not specifically limited in this embodiment of this application.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof means any combination thereof, including any combination of a single (piece) item or a plurality of (piece) items. For example, at least one (piece) of a, b, or c may represent: a, b, c, a and b, a and c, b and c, or a, b, and c, where a, b, and c may be in a singular or plural form. "A plurality of" means two or more, and another quantifier is similar to this. In addition, an element (element) that appears in singular forms "a", "an", and "the" does not mean "one or only one" unless otherwise specified in the context, but means "one or more". For example, "a device" means one or more devices.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

The various illustrative logical units and circuits described in the embodiments of the present invention may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be disposed in an ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to specific features and the embodiments thereof, apparently, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Apparently, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for network communications, comprising:
receiving, by a session management network element in a carrier network through a policy control function (PCF) from an application function (AF) functioning as a time sensitive network (TSN) translator interfacing a TSN network, an identifier of a port corresponding to a session of a terminal device, and a processing policy of a data flow for the port, wherein the data flow is a TSN flow;
determining, by the session management network element according to the identifier of the port, a type of a first device corresponding to the port; and
sending, by the session management network element according to the determined type of the first device, processing policy information to the first device, wherein the processing policy information comprises the identifier of the port and the processing policy of the data flow.

2. The method according to claim 1, wherein the first device is a user plane network element, and the step of sending comprises:
sending the processing policy information to the user plane network element through an N4 session modification request message.

3. The method according to claim 1, wherein the first device is a second terminal device, and the step of sending comprises:
sending the processing policy information to the second terminal device through a non-access stratum (NAS) message or a user plane network element.

4. The method according to claim 1, further comprising:
receiving, by the first device, the processing policy information.

5. The method according to claim 1, further comprising:
sending, by a policy control network element to the session management network element, the identifier of the port, and the processing policy of the data flow for the port.

6. The method according to claim 1, wherein the processing policy information is in a transparent container.

7. A carrier network system for network communications, comprising:
a policy control function (PCF);
a session management network element; and
a first device;
wherein the session management network element is configured to:
receive, through the PCF from an application function (AF) functioning as a time sensitive (TSN) translator interfacing a TSN network, an identifier of a port corresponding to a session of a terminal device and a processing policy of a data flow for the port, wherein the data flow is a TSN flow;
determine, according to the identifier of the port, a type of a first device corresponding to the port; and
send, according to the determined type of the first device, processing policy information to the first device, wherein the processing policy information comprises the identifier of the port and the processing policy of the data flow;
wherein the first device is configured to:
receive the processing policy information from the session management network element.

8. The system according to claim 7, wherein the first device is a user plane network element, and the session management network element is configured to send the processing policy information to the user plane network element through an N4 session modification request message.

9. The system according to claim 7, wherein the first device is a second terminal device, and the session management network element is configured to send the processing policy information to the second terminal device through a non-access stratum (NAS) message or a user plane network element.

10. The system according to claim 7, further comprises:
a policy control network element configured to send, to the session management network element, the identifier of the port and the processing policy of the data flow for the port.

11. The system according to claim 7, wherein the processing policy information is in a transparent container.

12. A session management network element in a carrier network, comprising:
a memory storing executable instructions;
a processor configured to execute the executable instructions to perform operations of:
receiving, through a policy control function (PCF) from an application function (AF) in the carrier network and functioning as a time sensitive network (TSN) translator interfacing a TSN network, an identifier of a port corresponding to a session of a terminal device, and a processing policy of a data flow for the port, wherein the data flow is a TSN flow;
determining, according to the identifier of the port, a type of a first device corresponding to the port; and
sending, according to the determined type of the first device, processing policy information to the first device, wherein the processing policy information comprises the identifier of the port and the processing policy of the data flow.

13. The session management network element according to claim 12, wherein the first device is a user plane network element, and the operation of sending comprises sending the processing policy information to the user plane network element through an N4 session modification request message.

14. The session management network element according to claim 12, wherein the first device is a second terminal device, and the operation of sending comprises sending the processing policy information to the second terminal device through a non-access stratum (NAS) message or a user plane network element.

15. The session management network element according to claim 12, wherein the processing policy information is in a transparent container.

16. A non-transitory storage medium having stored therein executable instructions which, when executed by a processor of a session management network entity of a carrier network, cause the session management network entity to:
receive, through a policy control function (PCF) from an application function (AF) functioning as a time sensitive network translator interfacing a TSN network, an identifier of a port corresponding to a session of a terminal device, and a processing policy of a data flow for the port, wherein the data flow is a TSN flow;
determine, according to the identifier of the port, a type of a first device corresponding to the port; and
send, according to the determined type of the first device, processing policy information to the first device, wherein the processing policy information comprises the identifier of the port and the processing policy of the data flow.

17. The non-transitory storage medium according to claim 16, wherein the first device is a user plane network element, and the instructions cause the session management network entity to send the processing policy information to the first device through an N4 session modification request message.

18. The non-transitory storage medium according to claim 16, wherein the first device is a second terminal device, and the instructions cause the session management network entity to send the processing policy information to the first device through a non-access stratum (NAS) message or a user plane network element.

19. The non-transitory storage medium according to claim 16, wherein the processing policy information is in a transparent container.

* * * * *